United States Patent
Oda

(10) Patent No.: US 10,883,161 B2
(45) Date of Patent: Jan. 5, 2021

(54) METHOD FOR MANUFACTURING CLAD MATERIAL

(71) Applicant: HITACHI METALS, LTD., Tokyo (JP)

(72) Inventor: Yoshimitsu Oda, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/090,909

(22) PCT Filed: Feb. 19, 2018

(86) PCT No.: PCT/JP2018/005757
§ 371 (c)(1),
(2) Date: Oct. 3, 2018

(87) PCT Pub. No.: WO2018/173586
PCT Pub. Date: Sep. 27, 2018

(65) Prior Publication Data
US 2019/0119801 A1    Apr. 25, 2019

(30) Foreign Application Priority Data
Mar. 24, 2017    (JP) ................. 2017-058567

(51) Int. Cl.
*C22F 1/08*    (2006.01)
*B23K 20/04*    (2006.01)
(Continued)

(52) U.S. Cl.
CPC .............. *C22F 1/08* (2013.01); *B23K 20/023* (2013.01); *B23K 20/04* (2013.01);
(Continued)

(58) Field of Classification Search
CPC combination set(s) only.
See application file for complete search history.

(56) References Cited

U.S. PATENT DOCUMENTS 8,802,242 B2    8/2014    Oda et al.
2012/0058360 A1    3/2012    Oda et al.
(Continued)

FOREIGN PATENT DOCUMENTS

JP    59-185588 A    10/1984
JP    5-200566 A    8/1993
(Continued)

OTHER PUBLICATIONS

Espacenet Machine Translation of JP S59-185588 (Year: 2019).*
(Continued)

*Primary Examiner* — Coris Fung
*Assistant Examiner* — Christopher D. Moody
(74) *Attorney, Agent, or Firm* — Westerman, Hattori, Daniels & Adrian, LLP

(57) ABSTRACT

A method for manufacturing a clad material (110, 410) includes performing a Ni plating treatment on a Cu material (104, 404) made of Cu or a Cu-based alloy to make a Ni-plated Cu material in which the Cu material is covered with a Ni plating layer, performing a heat treatment on the Ni-plated Cu material at a holding temperature of 650° C. or higher and 850° C. or lower, and bonding an Al material (102, 402) made of Al or an Al-based alloy and the Ni-plated Cu material on which the heat treatment has been performed to each other by rolling to make the clad material.

9 Claims, 13 Drawing Sheets

(51) Int. Cl.
| | |
|---|---|
| *H01M 2/20* | (2006.01) |
| *B23K 20/02* | (2006.01) |
| *B23K 20/233* | (2006.01) |
| *B23K 20/24* | (2006.01) |
| *B23K 103/10* | (2006.01) |
| *B23K 103/12* | (2006.01) |
| *B23K 103/18* | (2006.01) |
| *B23K 101/34* | (2006.01) |
| *B23K 101/38* | (2006.01) |
| *H01M 10/0525* | (2010.01) |
| *C25D 3/12* | (2006.01) |
| *C25D 5/50* | (2006.01) |
| *H01M 2/30* | (2006.01) |

(52) U.S. Cl.
CPC .......... *B23K 20/2333* (2013.01); *B23K 20/24* (2013.01); *C25D 3/12* (2013.01); *C25D 5/50* (2013.01); *H01M 2/20* (2013.01); *H01M 2/202* (2013.01); *H01M 2/30* (2013.01); *H01M 10/0525* (2013.01); *B23K 2101/34* (2018.08); *B23K 2101/38* (2018.08); *B23K 2103/10* (2018.08); *B23K 2103/12* (2018.08); *B23K 2103/18* (2018.08); *B23K 2103/26* (2018.08)

(56) References Cited

U.S. PATENT DOCUMENTS

| | | | | |
|---|---|---|---|---|
| 2014/0011074 A1* | 1/2014 | Oda | ........................ | H01M 2/30 429/160 |
| 2016/0308198 A1* | 10/2016 | Oda | .......................... | C22C 9/00 |
| 2017/0054131 A1 | 2/2017 | Yokota et al. | | |
| 2017/0077481 A1* | 3/2017 | Watanabe | ............... | H01M 2/26 |

FOREIGN PATENT DOCUMENTS

| | | |
|---|---|---|
| JP | 10-140397 A | 5/1998 |
| JP | 11-156995 A | 6/1999 |
| JP | 5569261 B2 | 8/2014 |
| JP | 2015-191755 A | 11/2015 |
| KR | 10-1167019 B1 | 7/2012 |

OTHER PUBLICATIONS

Espacenet Machine Translation of JP H11-156995 (Year: 2019).*
International Search Report dated Apr. 3, 2018, issued in counterpart application No. PCT/JP2018/005757 (3 pages).
Decision to Grant a Patent dated Jun. 19, 2018, issued in counterpart Japanese Patent Application No. 2018-524840, w/English translation (6 pages).
Notice of Final Rejection dated Jun. 27, 2019, issued in counterpart KR Application No. 10-2018-7028815, with English machine translation. (6 pages).
Office Action dated Feb. 11, 2019, issued in counterpart KR Application No. 10-2018-7028815, with English machine translation. (9 pages).
Office Action dated Apr. 10, 2019, issued in counterpart CN Application No. 2018800015696, with English machine translation. (13 pages).
Extended Search Report dated Sep. 19, 2019, issued in counterpart EP Application No. 18772318.4 (7 pages).
Office Action dated May 14, 2020, issued in counterpart EP Application No. 18 772 318.4 (6 pages).

* cited by examiner

COMPARATIVE EXAMPLE 4 (ROLLING REDUCTION: 40%)

COMPARATIVE EXAMPLE 4 (ROLLING REDUCTION: 80%)

FINE CRACK

EXAMPLE 2 (ROLLING REDUCTION: 40%)

EXAMPLE 2 (ROLLING REDUCTION: 80%)

EXAMPLE 3 (ROLLING REDUCTION: 40%)

EXAMPLE 3 (ROLLING REDUCTION: 80%)

METHOD FOR MANUFACTURING CLAD MATERIAL

TECHNICAL FIELD

The present invention relates to a method for manufacturing a clad material.

BACKGROUND ART

In general, a clad material in which a Ni-plated Cu material including a Ni plating layer and an Al material are bonded to each other is known. Such a clad material is disclosed in Japanese Patent Laid-Open No. 2015-191755, for example.

Japanese Patent Laid-Open No. 2015-191755 discloses a clad material in which a Cu material having a Ni plating layer formed on the outer surface thereof in order to improve its corrosion resistance and an Al material are bonded to each other through an interface that extends in a width direction. Japanese Patent Laid-Open No. 2015-191755 discloses making the clad material by performing Ni plating using a plating bath only on the outer surface of the Cu material after bonding the side edges of the Al material and the Cu material before the Ni plating treatment to each other to prepare a bonded material as a method for manufacturing the clad material.

However, in the method for manufacturing the clad material described in Japanese Patent Laid-Open No. 2015-191755, it is necessary to mask the entire exposed surface of the Al material during the Ni plating treatment in order to significantly reduce or prevent contact between the Al material and a plating solution of the plating bath. In this case, when the Al material is masked up to the vicinity of the interface, a portion of the outer surface of the Cu material may be masked. In this case, the Ni plating layer is not formed on the masked portion of the Cu material, and thus the masked portion of the Cu material is exposed such that the corrosion resistance of the clad material is disadvantageously reduced. In addition, the Ni plating is performed after rolling, and thus a step corresponding to the thickness of the plating is disadvantageously formed.

Therefore, in order to solve the disadvantages as described above, conceivably, a Ni plating treatment is performed in advance on a Cu material to make a Ni-plated Cu material, and thereafter the Ni-plated Cu material and an Al material are bonded to each other to manufacture a clad material. Here, a method for manufacturing a clad material in which a Ni plating treatment is performed in advance on a Cu material to make a Ni-plated Cu material, and thereafter the Ni-plated Cu material and another metal material (low-carbon steel or low-alloy steel) other than an Al material are bonded to each other is known. Such a method for manufacturing a clad material is disclosed in Japanese Patent Laid-Open No. 59-185588, for example.

Japanese Patent Laid-Open No. 59-185588 discloses a method for manufacturing a clad plate in which a base material made of low-carbon steel or low-alloy steel and a mating material made of Ni-plated Cu are made adjacent to each other and bonded to each other by rolling at a temperature in the range of 300° C. to 600° C. and at a rolling reduction of 15% to 65%, and thereafter annealing is performed thereon at a temperature of 500° C. or higher after cold or warm rolling.

PRIOR ART DOCUMENT

Patent Document

Patent Document 1: Japanese Patent Laid-Open No. 2015-191755
Patent Document 2: Japanese Patent Laid-Open No. 59-185588

SUMMARY OF THE INVENTION

Problems to be Solved by the Invention

However, the inventor of the present invention has found that in the method for manufacturing a clad plate described in Japanese Patent Laid-Open No. 59-185588, there is a problem that cracks are generated in a Ni plating layer of the mating material when the base material and the mating material made of the Ni-plated Cu are made adjacent to each other and rolled at 300° C. to 600° C. and at the rolling reduction of 15% to 65%, and that the corrosion resistance of the clad plate is reduced due to the cracks in the Ni plating layer. Furthermore, the inventor of the present invention has found that the base material and the mating material are not sufficiently bonded to each other in a portion of the Ni plating layer in which the cracks have been generated, and thus the bonding strength between the base material and the mating material is reduced.

Therefore, the inventor of the present invention has made the present invention in order to solve the problems based on the findings in the problems as described above, and an object of the present invention is to provide a method for manufacturing a clad material capable of significantly reducing or preventing generation of cracks in a Ni plating layer when a Ni plating treatment is performed in advance on a Cu material to make a Ni-plated Cu material, and thereafter the Ni-plated Cu material and an Al material are bonded to each other.

Means for Solving the Problems

As a result of earnest investigations to solve the aforementioned problems, the inventor of the present invention has found that the aforementioned problems can be solved by adjusting a heat treatment temperature.

That is, a method for manufacturing a clad material according to an aspect of the present invention includes performing a Ni plating treatment on a Cu material made of Cu or a Cu-based alloy to make a Ni-plated Cu material in which the Cu material is covered with a Ni plating layer, performing a heat treatment on the Ni-plated Cu material at a holding temperature of 650° C. or higher and 850° C. or lower, and bonding an Al material made of Al or an Al-based alloy and the Ni-plated Cu material on which the heat treatment has been performed to each other by rolling to make the clad material. Note that the "Cu-based alloy" and the "Al-based alloy" indicate an alloy containing 50 mass % or more of Cu as a main component and an alloy containing 50 mass % or more of Al as a main component, respectively.

As described above, in the method for manufacturing the clad material according to this aspect of the present invention, the heat treatment is performed on the Ni-plate Cu material at the holding temperature of 650° C. or higher and 850° C. or lower, and the Al material and the Ni-plated Cu material on which the heat treatment has been performed are bonded to each other by the rolling to make the clad material. Thus, the hardness of the Ni plating layer can be reduced by performing the heat treatment on the Ni-plated Cu material at the holding temperature of 650° C. or higher and 850° C. or lower. Consequently, unlike the case where the heat treatment is performed at 600° C. or lower, and thereafter the Al material and the Ni-plated Cu material on which the heat treatment has been performed are bonded to each other by the rolling to make the clad material as in Japanese Patent Laid-Open No. 2015-191755, generation of cracks in the Ni plating layer can be significantly reduced or prevented. Incidentally, it has already been confirmed by an experiment (examples) described below that generation of cracks in the Ni plating layer can be significantly reduced or prevented by performing the heat treatment at the holding temperature of 650° C. or higher and 850° C. or lower. In addition, the rolling is performed after the Ni plating is performed such that a step corresponding to the thickness of the plating is not formed, and the thickness of the clad material can be set to a predetermined thickness.

Furthermore, in the method for manufacturing the clad material according to this aspect, the heat treatment is performed on the Ni-plated Cu material at the holding temperature of 850° C. or lower such that unlike the case where the heat treatment is performed at a holding temperature that exceeds 850° C., diffusion of a large amount of Ni into Cu during the heat treatment can be significantly reduced or prevented. Thus, formation of voids at an interface between the Ni plating layer and the Cu material can be significantly reduced or prevented, and thus generation of cracks in the Ni plating layer starting from voids during the rolling can be significantly reduced or prevented.

Furthermore, in the method for manufacturing the clad material according to this aspect, the Ni-plated Cu material in which the Cu material is covered with the Ni plating layer is made, and thereafter the Al material and the Ni-plated Cu material are bonded to each other by the rolling to make the clad material. Thus, unlike the case where the Al material and the Cu material are bonded to each other, and thereafter the Ni plating treatment is performed on the Cu material, corrosion of the Al material due to adhesion of the treatment liquid of the Ni plating treatment thereto can be prevented. Furthermore, formation of a portion of the Ni-plated Cu material on which the Ni plating layer is not formed can be significantly reduced or prevented. Consequently, a reduction in the bonding strength between the Ni-plated Cu material and the Al material can be significantly reduced or prevented while a reduction in the corrosion resistance of the clad material is significantly reduced or prevented.

In the aforementioned method for manufacturing the clad material according to this aspect, the Al material and the Ni-plated Cu material on which the heat treatment has been performed are preferably bonded to each other by the rolling at a rolling reduction of 40% or more and 90% or less. In this case, the Al material and the Ni-plated Cu material on which the heat treatment has been performed are more preferably bonded to each other by the rolling at a rolling reduction of 60% or more and 80% or less. According to this structure, the rolling is performed at the rolling reduction of 40% or more (preferably 60% or more) such that likelihood of defects such as peeling and insufficient bonding strength in the clad material due to an excessively small rolling reduction can be significantly reduced or prevented. Furthermore, the rolling is performed at the rolling reduction of 90% or less (preferably 80% or less) such that the thickness of the clad material can be efficiently reduced while generation of cracks in the Ni plating layer due to an excessively large rolling reduction is significantly reduced or prevented.

In the aforementioned method for manufacturing the clad material according to this aspect, the holding temperature is preferably 700° C. or higher. According to this structure, the hardness of the Ni plating layer can be effectively reduced, and thus in the rolling of the Al material and the Ni-plated Cu material, the Ni plating layer can be deformed with deformation of the relatively soft Cu material. Consequently, generation of cracks in the Ni plating layer can be reliably significantly reduced or prevented.

In the aforementioned method for manufacturing the clad material according to this aspect, the heat treatment is preferably performed on the Ni-plated Cu material at the holding temperature for 0.5 minutes or more and 5 minutes or less. According to this structure, the heat treatment is performed at the holding temperature for 0.5 minutes or more such that the hardness of the Ni plating layer can be sufficiently reduced. Furthermore, the heat treatment is performed at the holding temperature for about 5 minutes or less such that an increase in the lead time for making the clad material due to an increase in the heat treatment time can be significantly reduced or prevented.

The aforementioned method for manufacturing the clad material according to this aspect preferably includes performing diffusion annealing on the clad material at an annealing holding temperature lower than the holding temperature. According to this structure, the bonding strength of the clad material can be improved by the diffusion annealing. Furthermore, the diffusion annealing is performed at the annealing holding temperature lower than the holding temperature such that melting of the Al material during the diffusion annealing can be significantly reduced or prevented while the bonding strength between the Ni-plated Cu material and the Al material is improved.

In the aforementioned method for manufacturing the clad material according to this aspect, each of the Al material and the Ni-plated Cu material is preferably plate-shaped, having a side end face perpendicular to a thickness direction, and the side end face of the plate-shaped Al material perpendicular to the thickness direction and the side end face of the plate-shaped and heat-treated Ni-plated Cu material perpendicular to the thickness direction are preferably made adjacent to each other and bonded to each other by the rolling. In manufacturing this clad material (so-called parallel-bonded material) in which the side end faces are bonded to each other, the heat treatment is performed on the Ni-plated Cu material at the holding temperature of 650° C. or higher and 850° C. or lower such that generation of cracks in the Ni plating layer can be significantly reduced or prevented. Thus, when the side end faces where the bonding area tends to be small are bonded to each other, a reduction in the bonding strength between the Ni-plated Cu material and the Al material can be significantly reduced or prevented while a reduction in the corrosion resistance of the clad material is significantly reduced or prevented.

In this case, the clad material is preferably a bus bar for a lithium-ion secondary battery. According to this structure, a pair of terminals for the lithium-ion secondary battery made of different materials (a positive electrode terminal made of Al and a negative electrode terminal made of Cu, for example) can be easily connected to each other by the clad material in which the side end faces are bonded to each other.

In the aforementioned method for manufacturing the clad material according to this aspect, each of the Al material and the Ni-plated Cu material is preferably plate-shaped, and a surface of the plate-shaped Al material in a thickness direction and a surface of the plate-shaped and heat-treated Ni-plated Cu material in the thickness direction are preferably made adjacent to each other and bonded to each other by the rolling. In manufacturing this clad material in which the surfaces in the thickness direction are bonded to each other, the heat treatment is performed on the Ni-plated Cu material at the holding temperature of 650° C. or higher and 850° C. or lower such that generation of cracks in the Ni plating layer can be significantly reduced or prevented. Thus, when the surfaces in the thickness direction are bonded to each other, a reduction in the bonding strength between the Ni-plated Cu material and the Al material can be significantly reduced or prevented while a reduction in the corrosion resistance of the clad material is significantly reduced or prevented.

In this case, the clad material is preferably a terminal for a lithium-ion secondary battery. According to this structure, a bus bar and a collector for the lithium-ion secondary battery made of different materials (a bus bar made of Al and a negative electrode collector made of Cu, for example) can be easily connected to each other by the clad material in which the surfaces are bonded to each other.

Effect of the Invention

According to the present invention, as described above, the method for manufacturing the clad material capable of significantly reducing or preventing generation of the cracks in the Ni plating layer when the Ni plating treatment is performed in advance on the Cu material to make the Ni-plated Cu material, and thereafter the Ni-plated Cu material and the Al material are bonded to each other.

MODES FOR CARRYING OUT THE INVENTION

Embodiments embodying the present invention are hereinafter described on the basis of the drawings.

(First Embodiment)

The structure of an assembled battery 100 according to a first embodiment of the present invention in which a clad material 10 is used as a bus bar 1 is now described with reference to FIGS. 1 to 3.

The structure of the assembled battery 100 according to the first embodiment of the present invention is described.

Figure 1:
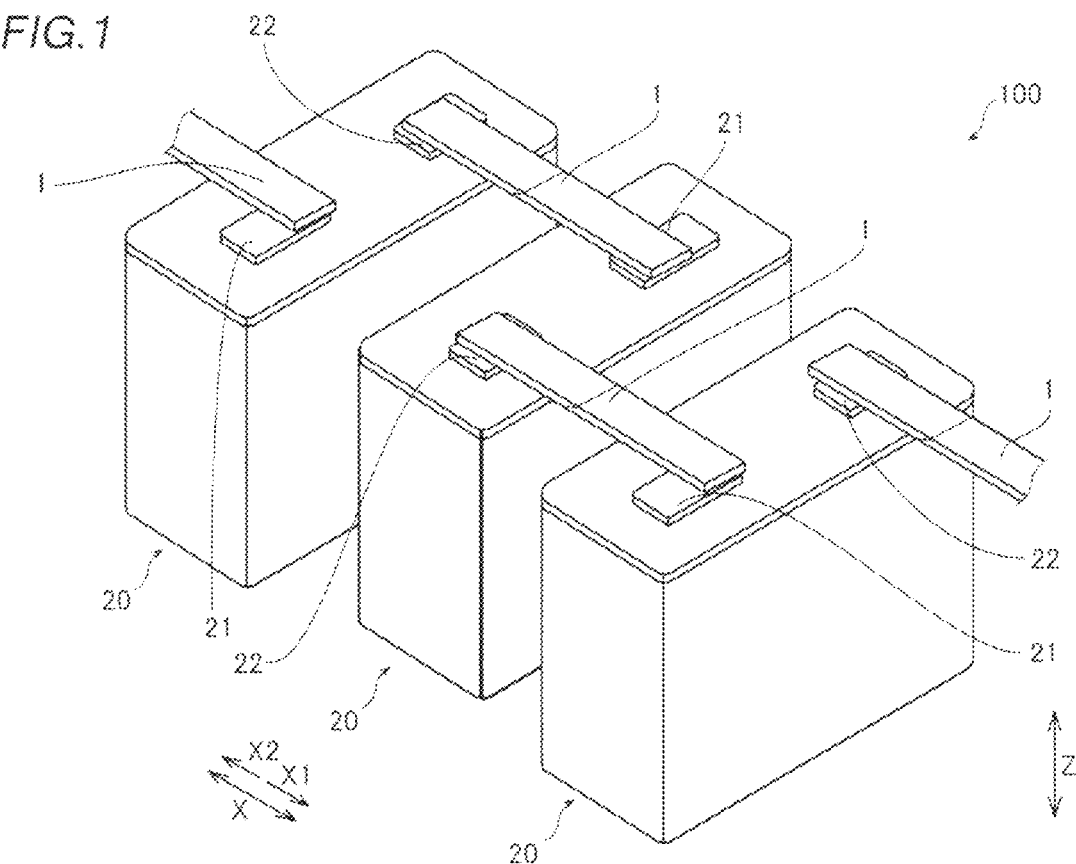
FIG. 1 A perspective view showing a state where a clad material according to a first embodiment of the present invention is used as a bus bar.

As shown in FIG. 1, in the assembled battery 100 according to the first embodiment of the present invention, a plurality of lithium-ion secondary batteries 20 are electrically connected to each other by a plurality of flat plate-like bus bars 1.

A positive electrode terminal 21, which is made of Al, of a predetermined lithium-ion secondary battery 20 is welded (bonded) to one end (an end on the X1 side) of the bus bar 1 in a direction X. Furthermore, a negative electrode terminal 22, which is made of Cu, of a lithium-ion secondary battery 20 adjacent to the predetermined lithium-ion secondary battery 20 is welded to the other end (an end on the X2 side) of the bus bar 1 in the direction X. Thus, in the assembled battery 100, the plurality of lithium-ion secondary batteries 20 are connected in series to each other.

Figure 2:
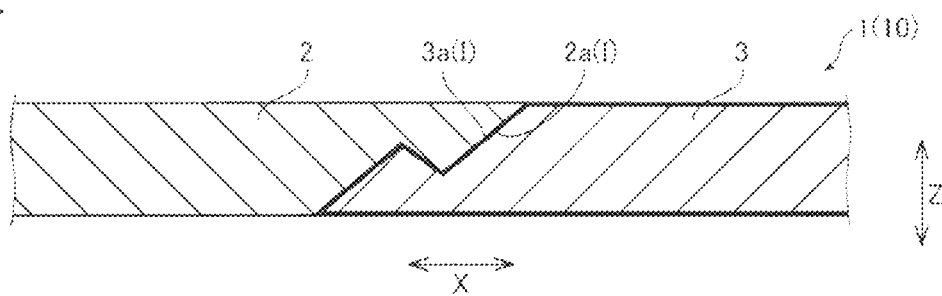
FIG. 2 A sectional view of the vicinity of a bonding interface of the clad material according to the first embodiment of the present invention.

As shown in FIG. 2, the bus bar 1 is made of a plate-shaped clad material 10 in which a plate-shaped Al portion 2 and a plate-shaped Ni-plated Cu portion 3 are bonded to each other. In the bus bar 1, a side end face 2a of the plate-shaped Al portion 2 in the direction X perpendicular to a thickness direction (direction Z) and a side end face 3a of the plate-shaped Ni-plated Cu portion 3 in the direction X perpendicular to the thickness direction (direction Z) are adjacently bonded to each other. That is, the clad material 10 of which the bus bar 1 is made is a so-called parallel-bonded material.

The Al portion 2 is made of Al or an Al-based alloy. As the Al, A1000 series such as A1050 and A1080 defined in JIS H4000 can be used. As the Al-based alloy, A3000 series and A6000 series defined in JIS H4000, for example, can be used. On the side end face 2a of the Al portion 2 in the direction X perpendicular to the thickness direction, which is bonded to the Ni-plated Cu portion 3, valleys and mountains are provided in the thickness direction (direction Z) and the direction X so as to correspond to mountains and valleys provided on the side end face 3a of the Ni-plated Cu portion 3 described below, respectively.

Figure 3:
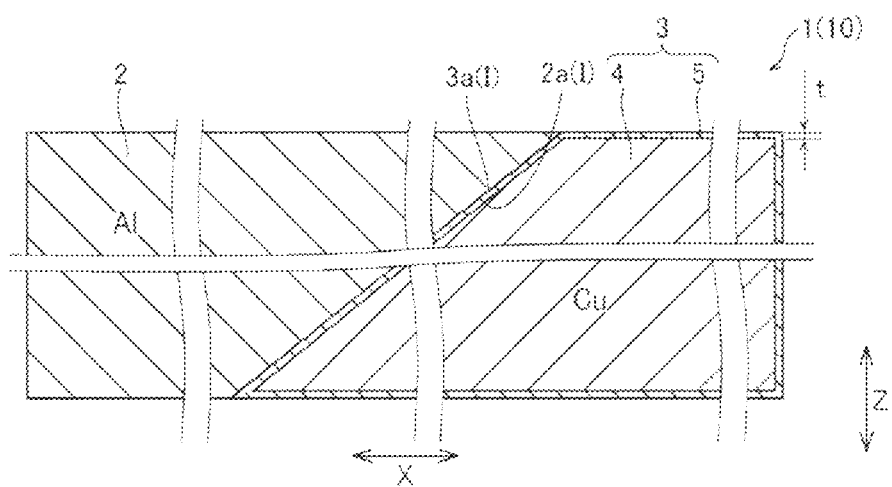
FIG. 3 An enlarged sectional view of the clad material according to the first embodiment of the present invention.

As shown in FIG. 3, the Ni-plated Cu portion 3 includes a plate-shaped Cu material 4 made of Cu or a Cu-based alloy and a Ni plating layer 5 that covers the Cu material 4. As the Cu, C1000 series such as C1020 (oxygen-free copper), C1100 (tough pitch copper), and C1220 (phosphorus deoxidized copper) defined in JIS H3100 can be used. As the Cu-based alloy, C2000 series defined in JIS H3100, for example, can be used. In FIG. 2, the Ni plating layer 5 is shown by a thick line.

The Ni plating layer 5 is formed throughout two side end faces in the direction X perpendicular to the thickness direction and both surfaces in the thickness direction. The Ni plating layer 5 is made of 99 mass % or more of Ni and inevitable impurities. Furthermore, the Ni plating layer 5 is formed by performing an electrolytic plating treatment described below on the plate-shaped Cu material 4.

The thickness t of the Ni plating layer 5 is preferably about 2 μm or more and about 10 μm or less. The thickness t of the Ni plating layer 5 is set to about 2 μm or more such that corrosion of the bus bar 1 can be reliably significantly reduced or prevented. The thickness t of the Ni plating layer 5 is set to about 10 μm or less such that an increase in the time required for forming the Ni plating layer 5 can be significantly reduced or prevented.

On the side end face 3a, which is bonded to the Al portion 2, of two side end faces in the direction X of the Ni-plated Cu portion 3, the mountains and the valleys are provided in the thickness direction (direction Z) and the direction X so as to correspond to the valleys and the mountains provided on the side end face 2a of the Al portion 2, respectively. Furthermore, a bonding interface I is formed between the side end face 2a and the side end face 3a by diffusion annealing. Note that the valleys of the side end face 2a engage with the mountains of the side end face 3a, and the mountains of the side end face 2a engage with the valleys of the side end face 3a such that the bonding strength between the side end face 2a and the side end face 3a is improved.

According to the first embodiment, large cracks of 500 μm or more caused by a rolling step described below and cracks (fine cracks) that can be visually recognized at a magnification of 100 times are not generated in the Ni plating layer 5. Furthermore, there is hardly any bonding failure portion (a portion of the side end face 3a not bonded to the side end face 2a) caused by a gas at the bonding interface I.

A manufacturing process for the bus bar 1 according to the first embodiment is now described with reference to FIGS. 2 to 6. In the first embodiment, a method for continuously making the bus bar 1 is described.

(Making of Ni-Plated Cu Material)

Figure 4:
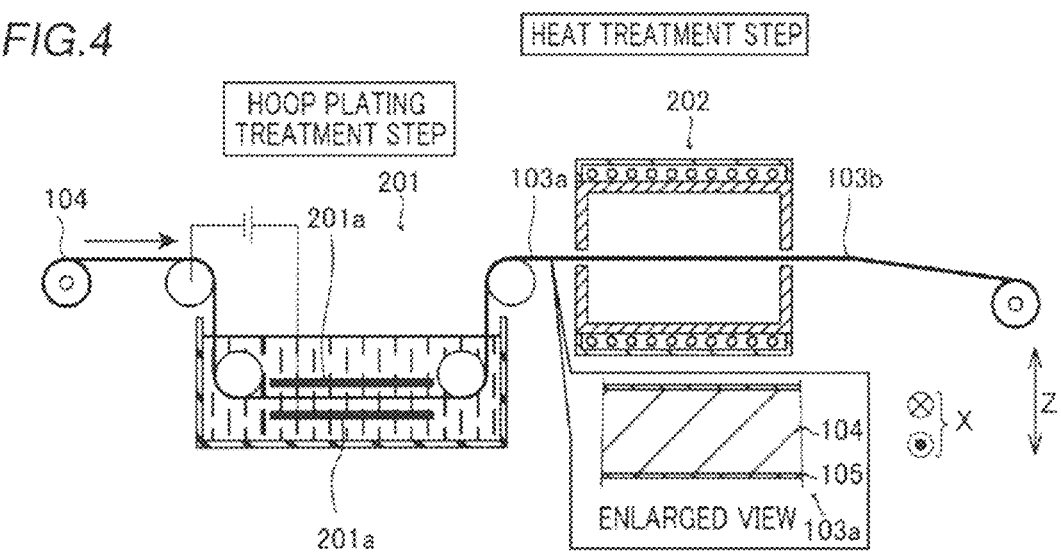
FIG. 4 A schematic view illustrating a manufacturing process for the clad material according to the first embodiment of the present invention.

First, a band-shaped (plate-shaped) Cu material 104 (see FIG. 4) made of Cu or a Cu-based alloy is prepared. Then, valleys and mountains are provided on a side end face (see FIGS. 2 and 3) of the band-shaped Cu material 104 in a width direction (direction X). At this time, the valleys and the mountains are provided over the entirety thereof in a direction (longitudinal direction) perpendicular to the width direction. Thereafter, as shown in FIG. 4, an electrolytic plating treatment (hoop plating treatment) is performed on the Cu material 104 such that an Ni plating layer 105 is continuously formed on the entire surface of the Cu material 104 (see an enlarged view in a speech balloon in FIG. 4).

Specifically, the Cu material 104 is caused to pass through an electroplating bath 201 such that the Ni plating layer 105 is formed on the entire surface of the Cu material 104. The electroplating bath 201 is a so-called Watts bath. That is, in the electroplating bath 201, an electrolytic plating aqueous solution containing predetermined concentrations of nickel sulfate, nickel chloride, boric acid, etc. and Ni materials 201a placed in the electrolytic plating aqueous solution and connected to one electrode are disposed. Then, an electric current flows in a state where the other electrode is connected to the Cu material 104 such that nickel ions in the electrolytic plating aqueous solution migrate to a surface of the Cu material 104 and precipitate thereon to form a Ni coating. Nickel ions are gradually dissolved from the Ni materials 201a into the electrolytic plating aqueous solution to be replenished therein, and thus the Ni coating eventually grows into the Ni plating layer 105. Therefore, the Ni plating layer 105 is formed on the entire surface of the Cu material 104. Thus, a band-shaped Ni-plated Cu material 103a in which the Cu material 104 is covered with the Ni plating layer 105 is made.

Thereafter, in the manufacturing method according to the first embodiment, a heat treatment is performed on the Ni-plated Cu material 103a at a holding temperature of 650° C. or higher and 850° C. or lower. Specifically, as shown in FIG. 4, the Ni-plated Cu material 103a is caused to pass through a heating furnace 202, the interior temperature of which is kept at the holding temperature of 650° C. or higher and 850° C. or lower such that the heat treatment is performed on the Ni-plated Cu material 103a.

The aforementioned heat treatment is preferably performed on the Ni-plated Cu material 103a for a heat treatment time of about 0.5 minutes or more and about 5 minutes or less. Thus, the Ni plating layer 105 is annealed such that the hardness of the Ni plating layer 105 is sufficiently reduced. Furthermore, foreign substances such as organic substances mixed in the Ni plating layer 105 during the Ni plating treatment are thermally decomposed. Then, a gas generated by the decomposition is discharged from the Ni plating layer 105 together with moisture mixed in the Ni plating layer 105 during the Ni plating treatment. Consequently, the foreign substances in the Ni plating layer 105 are removed.

Note that the holding temperature is more preferably about 700° C. or higher, and still more preferably about 750° C. or higher in order to sufficiently reduce the hardness of the Ni plating layer 105. In addition, the holding temperature is more preferably about 750° C. or higher, and still more preferably about 800° C. or higher in order to sufficiently remove the foreign substances in the Ni plating layer 105. The heat treatment time is preferably about 1 minute or more in order to more sufficiently reduce the hardness of the Ni plating layer 105. In addition, the heat treatment time is more preferably about 3 minutes or less in order to significantly reduce or prevent an increase in the lead time of the clad material. The time of the heat treatment applied to the Ni-plated Cu material 103a is reduced such that a Ni-plated Cu material 103b on which the heat treatment has been performed can be continuously made.

Then, the heat-treated band-shaped Ni-plated Cu material 103b is air-cooled.

(Making of Bus Bar)

Figure 5:
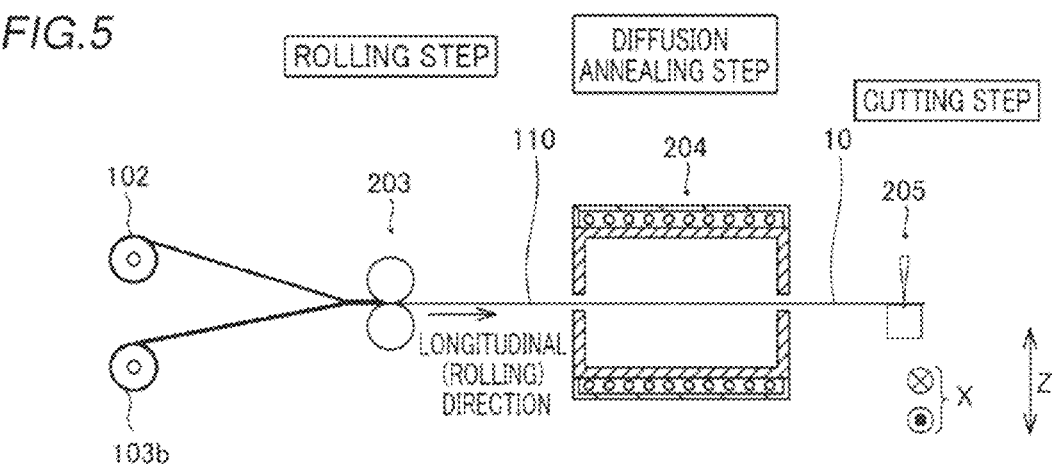
FIG. 5 A schematic view illustrating the manufacturing process for the clad material according to the first embodiment of the present invention.
Figure 6:
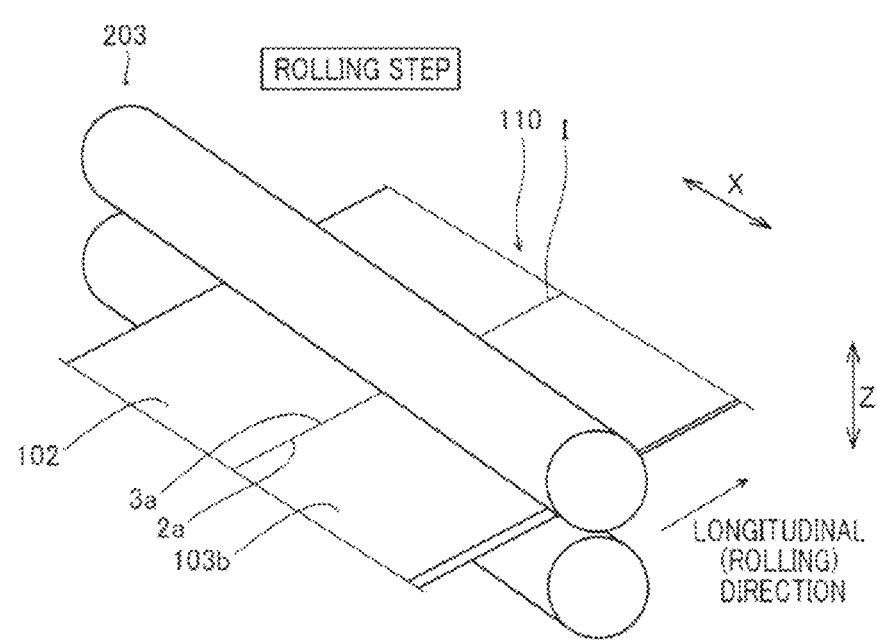
FIG. 6 A schematic perspective view illustrating a rolling step for the clad material according to the first embodiment of the present invention.

Next, a band-shaped (plate-shaped) Al material 102 made of Al or an Al-based alloy is prepared. Then, valleys and mountains are provided on the side end face 2a (see FIGS. 2 and 3) of the Al material 102 in the width direction. Thereafter, as shown in FIGS. 5 and 6, the Al material 102 and the Ni-plated Cu material 103b are made adjacent to each other in the width direction (direction X), and the side end face 2a and the side end face 3a on which the valleys and the mountains are provided engage with each other. Then, the side end face 2a of the Al material 102 and the side end face 3a of the Ni-plated Cu material 103b are bonded to each other (see FIGS. 2 and 3) by cold rolling using a roller 203. At this time, the cold rolling is performed such that the rolling direction and the longitudinal direction in which the side end faces 2a and 3a extend coincide with each other, and the rolling is performed over the entirety of the Al material 102 and the Ni-plated Cu material 103b in the width direction (direction X).

The cold rolling reduction is preferably about 40% or more and about 90% or less. The rolling reduction is preferably about 60% or more in order to significantly reduce or prevent defects such as insufficient bonding strength. In addition, the rolling reduction is more preferably about 80% or less in order to significantly reduce or prevent generation of cracks in the Ni plating layer 5 (105). Thus, a band-shaped clad material 110 in which the Al material 102 and the Ni-plated Cu material 103b are bonded to each other in the width direction is made. The "rolling reduction" is a percentage obtained by dividing a difference in thickness between a plate material before the rolling and the plate material after the rolling by the thickness of the plate material before the rolling.

Thereafter, as shown in FIG. 5, the band-shaped clad material 110 is caused to pass through a heating furnace 204, the interior temperature of which is kept at an annealing holding temperature such that the diffusion annealing is performed on the band-shaped clad material 101. The annealing holding temperature (about 500° C. or higher and about 600° C. or lower, for example) is lower than the holding temperature (650° C. or higher and 850° C. or lower) during the heat treatment performed on the Ni-plated Cu material 103a before the rolling. Then, at the aforementioned annealing holding temperature, the diffusion annealing is performed for an annealing time of about 0.5 minutes or more and about 3 minutes or less. Thus, strong bonding is achieved on the bonding interface I between the Al portion 2 and the Ni-plated Cu portion 3 due to atomic diffusion, compound formation, or the like. Consequently, a band-shaped clad material 10 (see FIGS. 2 and 3) is made. Finally, the bus bar 1 shown in FIGS. 2 and 3 is made by cutting the clad material 10 with a cutting machine 205 such that the length thereof in the longitudinal (rolling) direction becomes a predetermined length.

(Effects of First Embodiment)

According to the first embodiment, the following effects are achieved.

According to the first embodiment, as described above, the heat treatment is performed on the Ni-plated Cu material 103a at the holding temperature of 650° C. or higher and 850° C. or lower, and the Al material 102 and the Ni-plated Cu material 103b on which the heat treatment has been performed are bonded to each other by the rolling to make the clad material 10 (110). Thus, the hardness of the Ni plating layer 5 can be reduced by performing the heat treatment on the Ni-plated Cu material 103a at the holding temperature of 650° C. or higher and 850° C. or lower. Consequently, unlike the case where the heat treatment is performed at 600° C. or lower, and thereafter the Al material and the Ni-plated Cu material on which the heat treatment has been performed are bonded to each other by the rolling to make the clad material, generation of cracks in the Ni plating layer 5 can be significantly reduced or prevented. In addition, the rolling is performed after Ni plating is performed such that a step corresponding to the thickness of the plating is not formed, and the thickness of the clad material can be set to a predetermined thickness.

According to the first embodiment, the heat treatment is performed on the Ni-plated Cu material 103a at the holding temperature of 850° C. or lower such that unlike the case where the heat treatment is performed at a holding temperature that exceeds 850° C., diffusion of a large amount of Ni into the Cu material 104 during the heat treatment can be significantly reduced or prevented. Thus, formation of voids at an interface between the Ni plating layer 5 and the Cu material 4 can be significantly reduced or prevented, and thus generation of cracks in the Ni plating layer 105 starting from voids during the rolling can be significantly reduced or prevented.

According to the first embodiment, the Ni-plated Cu material 103a in which the Cu material 104 is covered with the Ni plating layer 5 is made, and thereafter the Al material 102 and the Ni-plated Cu material 103b are bonded to each other by the rolling to make the clad material 10 (110). Thus, unlike the case where the Al material and the Cu material are bonded to each other, and thereafter the Ni plating treatment is performed on the Cu material, corrosion of the Al material due to adhesion of the treatment liquid of the Ni plating treatment thereto can be prevented. Furthermore, formation of a portion of the Ni-plated Cu material 104b (Ni-plated Cu portion 3) on which the Ni plating layer 5 is not formed can be significantly reduced or prevented. Consequently, a reduction in the bonding strength between the Ni-plated Cu material 103b and the Al material 102 (the bonding strength between the Ni-plated Cu portion 3 and the Al portion 2) can be significantly reduced or prevented while a reduction in the corrosion resistance of the clad material 10 is significantly reduced or prevented.

According to the first embodiment, the Al material 102 and the Ni-plated Cu material 103b on which the heat treatment has been performed are bonded to each other by the rolling at the rolling reduction of about 40% or more and about 90% or less. Thus, the rolling is performed at the rolling reduction of about 40% or more (preferably about 60% or more) such that likelihood of defects such as peeling and insufficient bonding strength in the clad material 110 due to an excessively small rolling reduction can be significantly reduced or prevented. Furthermore, the rolling is performed at the rolling reduction of about 90% or less (preferably about 80% or less) such that the thickness of the clad material 110 can be efficiently reduced while generation of cracks in the Ni plating layer 105 due to an excessively large rolling reduction is significantly reduced or prevented.

According to the first embodiment, the holding temperature during the heat treatment is set to about 700° C. or higher such that the hardness of the Ni plating layer 105 can be effectively reduced. Thus, in the rolling of the Al material 102 and the Ni-plated Cu material 103*b*, the Ni plating layer 105 can be deformed with deformation of the relatively soft Cu material 104. Consequently, generation of cracks in the Ni plating layer 105 can be reliably significantly reduced or prevented.

According to the first embodiment, the heat treatment is performed at the holding temperature of 650° C. or higher and 850° C. or lower for a holding time of about 0.5 minutes or more such that the hardness of the Ni plating layer 5 can be sufficiently reduced. Furthermore, the heat treatment is performed at the holding temperature of 650° C. or higher and 850° C. or lower for about 5 minutes or less such that an increase in the lead time for making the clad material 10 (110) due to an increase in the heat treatment time can be significantly reduced or prevented.

According to the first embodiment, the diffusion annealing is performed on the clad material 110 at the annealing holding temperature lower than the holding temperature. Thus, the bonding strength of the clad material 10 (110) can be improved by the diffusion annealing. Furthermore, the diffusion annealing is performed at the annealing holding temperature lower than the holding temperature such that melting of the Al material 102 during the diffusion annealing can be significantly reduced or prevented while the bonding strength between the Ni-plated Cu material 103*b* and the Al material 102 is improved.

According to the first embodiment, the side end face 2*a* of the plate-shaped Al material 102 perpendicular to the thickness direction and the side end face 3*a* of the plate-shaped Ni-plated Cu material 103*b*, on which the heat treatment has been performed, perpendicular to the thickness direction are made adjacent to each other and bonded to each other by the rolling. In manufacturing this clad material 10 (so-called parallel-bonded material) in which the side end faces 2*a* and 3*a* are bonded to each other, the heat treatment is performed on the Ni-plated Cu material 103*b* at the holding temperature of 650° C. or higher and 850° C. or lower such that generation of cracks in the Ni plating layer 5 can be significantly reduced or prevented. Thus, when the side end faces 2*a* and 3*a* where the bonding area tends to be small are bonded to each other, a reduction in the bonding strength between the Ni-plated Cu material 103*b* and the Al material 102 can be significantly reduced or prevented while a reduction in the corrosion resistance of the Ni-plated Cu material 103*b* (Ni-plated Cu portion 3) is significantly reduced or prevented.

According to the first embodiment, the clad material 10 is used as the bus bar 1 for the lithium-ion secondary batteries 20. Thus, the positive electrode terminal 21 and the negative electrode terminal 22 made of different materials can be easily connected to each other by the clad material 10 in which the side end faces 2*a* and 3*a* are bonded to each other.

(Second Embodiment)

The structure of a lithium-ion secondary battery 320 according to a second embodiment of the present invention in which a clad material 310 is used as a negative electrode terminal 322 is now described with reference to FIGS. 7 to 9. The negative electrode terminal 322 is an example of a "terminal" in the claims.

Figure 7:
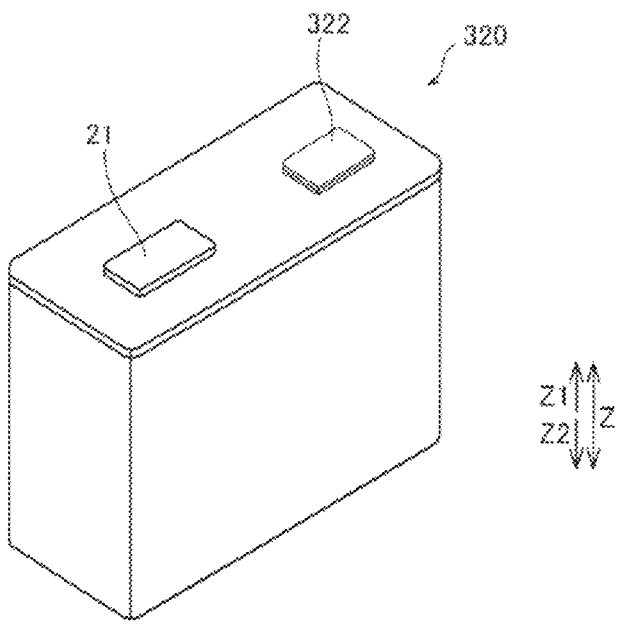
FIG. 7 A perspective view showing a state where a clad material according to a second embodiment of the present invention is used as a negative electrode terminal.

As shown in FIG. 7, the lithium-ion secondary battery 320 according to the second embodiment of the present invention includes a positive electrode terminal 21 and the negative electrode terminal 322. Similarly to the positive electrode terminal 11 and the negative electrode terminal 12 (see FIG. 1) according to the aforementioned first embodiment, the positive electrode terminal 21 and the negative electrode terminal 322 are respectively welded (bonded) to one end and the other end of a bus bar 301 (see FIG. 8) made of Al.

Figure 8:
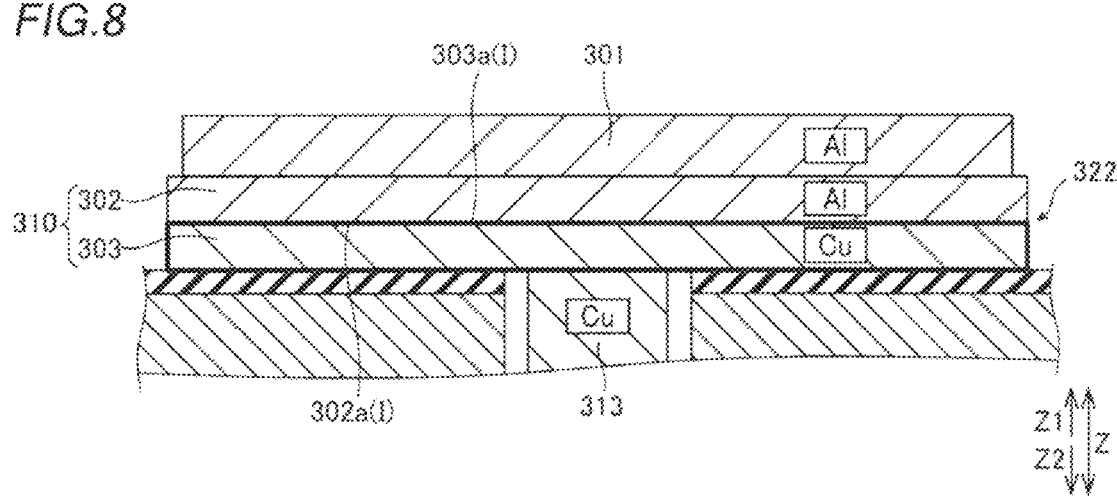
FIG. 8 A sectional view showing a state where the clad material according to the second embodiment of the present invention is used as the negative electrode terminal.
Figure 9:
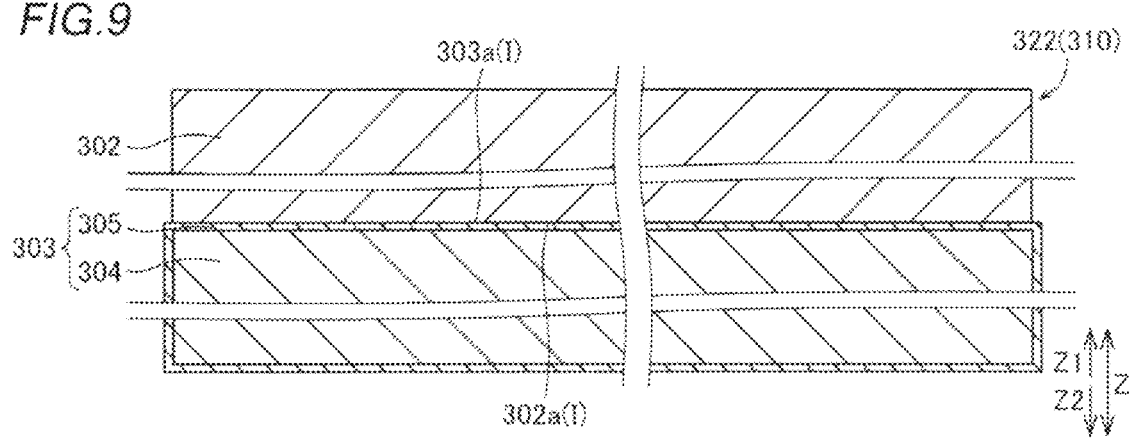
FIG. 9 An enlarged sectional view showing a state where the clad material according to the second embodiment of the present invention is used as the negative electrode terminal.

As shown in FIGS. 8 and 9, the negative electrode terminal 322 is made of a two-layered clad material 310 in which a plate-shaped Al portion 302 and a plate-shaped Ni-plated Cu portion 303 are bonded to each other in a thickness direction (direction Z). In the negative electrode terminal 322, the Z2-side surface 302*a* of the plate-shaped Al portion 302 and a Z1-side surface 303*a* of the Ni-plated Cu portion 303 are bonded to each other throughout in the thickness direction (direction Z). That is, the negative electrode terminal 322 is made of an overlay clad material 310.

Similarly to the Al portion 2 according to the aforementioned first embodiment, the Al portion 302 is made of Al or an Al-based alloy. As shown in FIG. 9, similarly to the Ni-plated Cu portion 3 according to the aforementioned first embodiment, the Ni-plated Cu portion 303 includes a plate-shaped Cu material 304 made of Cu or a Cu-based alloy and a Ni plating layer 305 that covers the Cu material 304. In addition, a bonding interface I is formed between the surface 302*a* of the Al portion 302 and the surface 303*a* of the Ni-plated Cu portion 303 by diffusion annealing. In FIG. 8, the Ni plating layer 305 is shown by a thick line.

As shown in FIG. 8, the bus bar 301 made of Al, as described above, is bonded to the Al portion 302 of the clad material 310 disposed on the upper side (Z1 side). A negative electrode collector 313 (a terminal that collects current collector foils of a negative electrode) made of Cu and connected to a negative electrode (not shown) is bonded to the Ni-plated Cu portion 303 of the clad material 310 disposed on the lower side (Z2 side).

According to the second embodiment, similarly to the Ni plating layer 5 according to the aforementioned first embodiment, in the Ni plating layer 305 (see FIG. 9), large cracks and fine cracks due to a rolling step described below are not generated. Furthermore, there is hardly any bonding failure portion (a portion of the surface 303*a* not bonded to the surface 302*a*) caused by a gas at the bonding interface I. The remaining structures of the second embodiment are similar to those of the aforementioned first embodiment.

A manufacturing process for the negative electrode terminal 322 according to the second embodiment is now described with reference to FIGS. 8 to 12. In this second embodiment, a method for continuously making the negative electrode terminal 322 is described. In the manufacturing method according to the second embodiment, description of the same steps as those according to the aforementioned first embodiment is omitted as appropriate.

(Making of Ni-Plated Cu Material)

Figure 10:
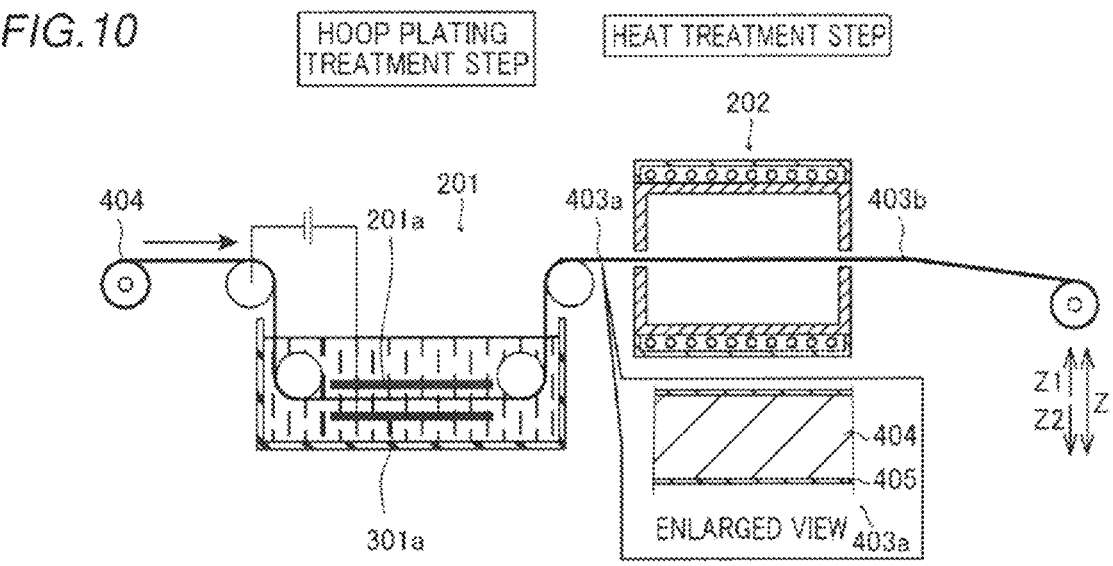
FIG. 10 A schematic view illustrating a manufacturing process for the clad material according to the second embodiment of the present invention.

First, a band-shaped (plate-shaped) Cu material 404 (see FIG. 10) made of Cu or a Cu-based alloy is prepared. Thereafter, as shown in FIG. 10, an electrolytic plating treatment (hoop plating treatment) is performed on the Cu material 404 similarly to the manufacturing process (see FIG. 4) according to the aforementioned first embodiment. Thus, a band-shaped Ni-plated Cu material 403*a* (see an enlarged view in a speech balloon in FIG. 10) in which the Cu material 404 is covered with a Ni plating layer 405 is made.

Thereafter, in the manufacturing method according to the second embodiment, similarly to the manufacturing process according to the aforementioned first embodiment, a heat treatment is performed on the Ni-plated Cu material 403a at a holding temperature of 650° C. or higher and 850° C. or lower for the holding time. Then, a heat-treated band-shaped Ni-plated Cu material 403b is air-cooled.

(Making of Negative Electrode Terminal)

Figure 11:
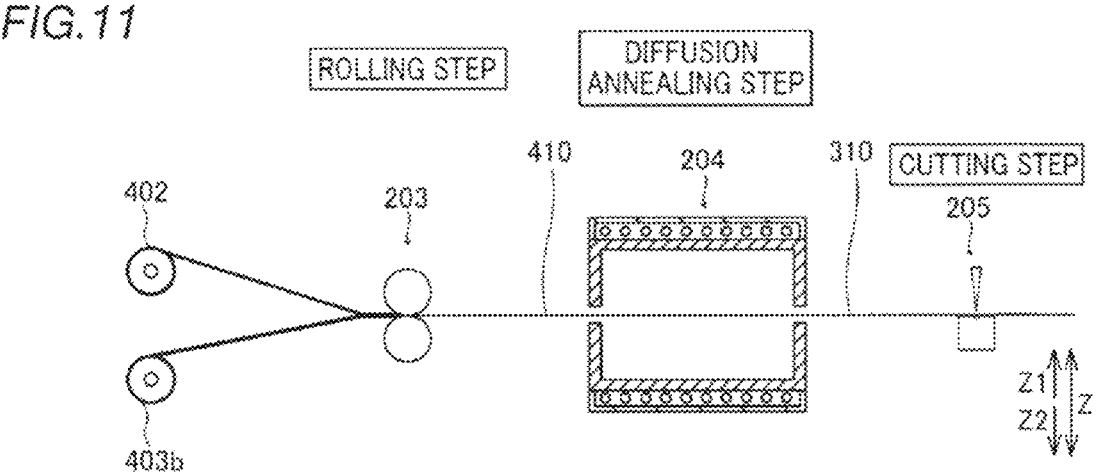
FIG. 11 A schematic view illustrating the manufacturing process for the clad material according to the second embodiment of the present invention.
Figure 12:
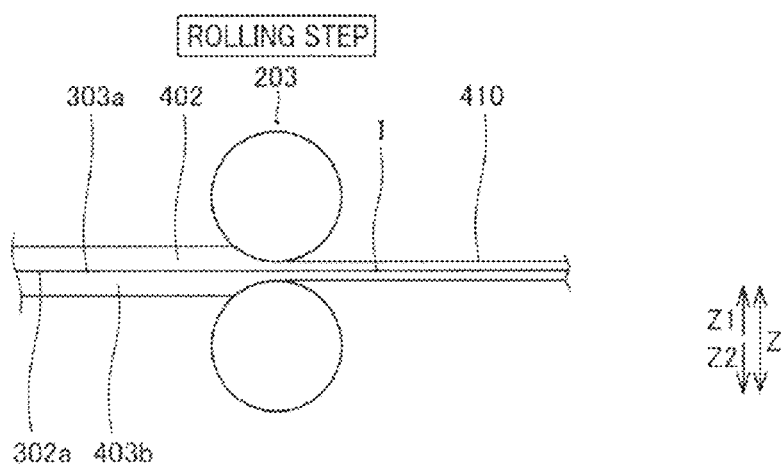
FIG. 12 A schematic view illustrating a rolling step for the clad material according to the second embodiment of the present invention.
Figure 13:
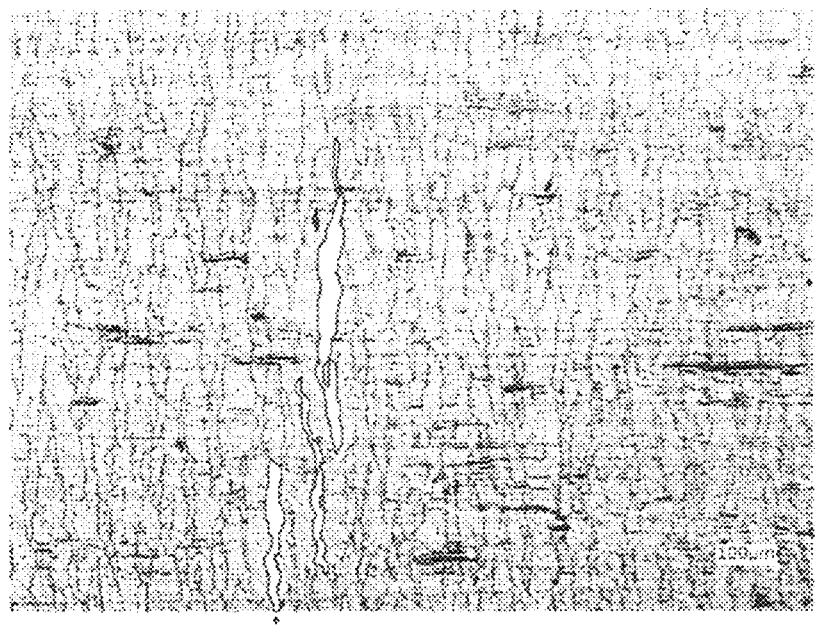
FIG. 13 A photograph showing the surface condition of Comparative Example 1 (rolling reduction: 60%).
Figure 14:
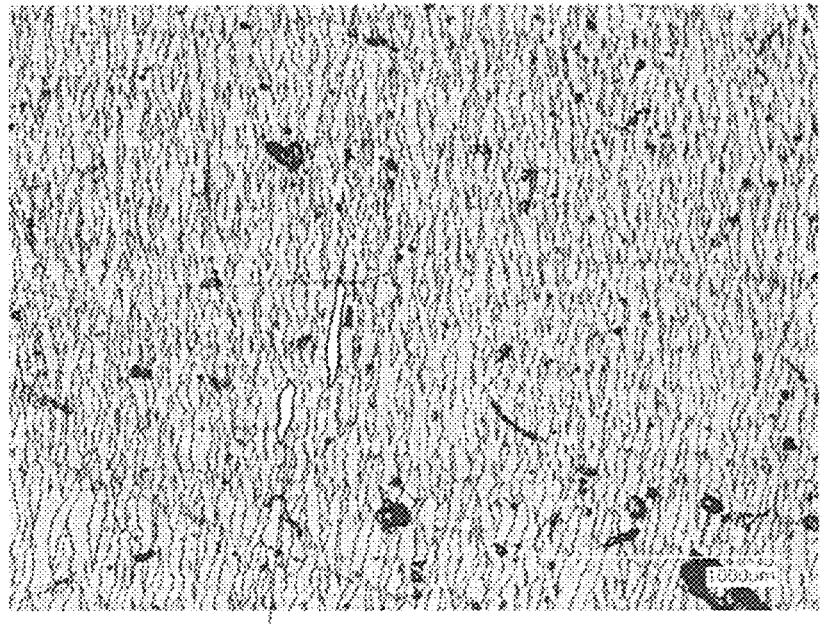
FIG. 14 A photograph showing the surface condition of Comparative Example 2 (rolling reduction: 60%).
Figure 15:
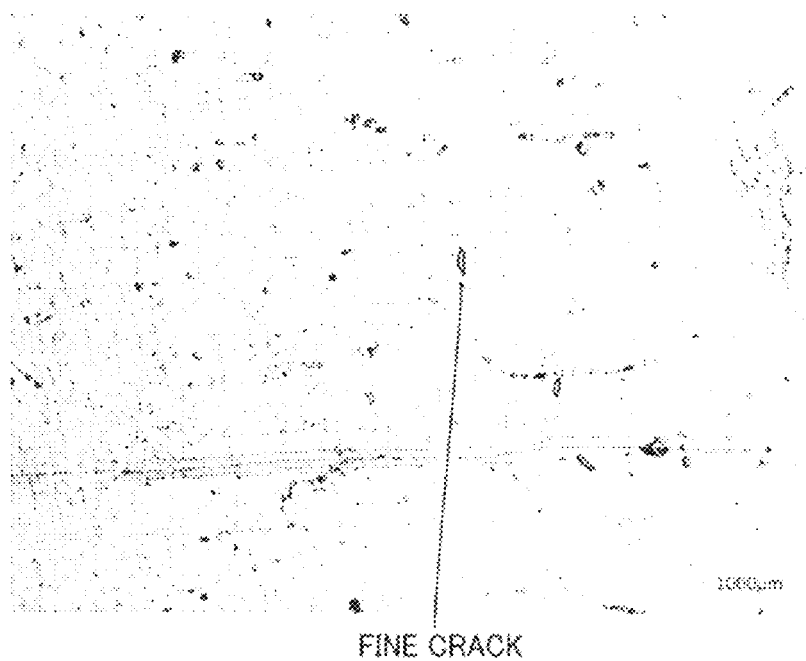
FIG. 15 A photograph showing the surface condition of Comparative Example 3 (rolling reduction: 60%).
Figure 16:
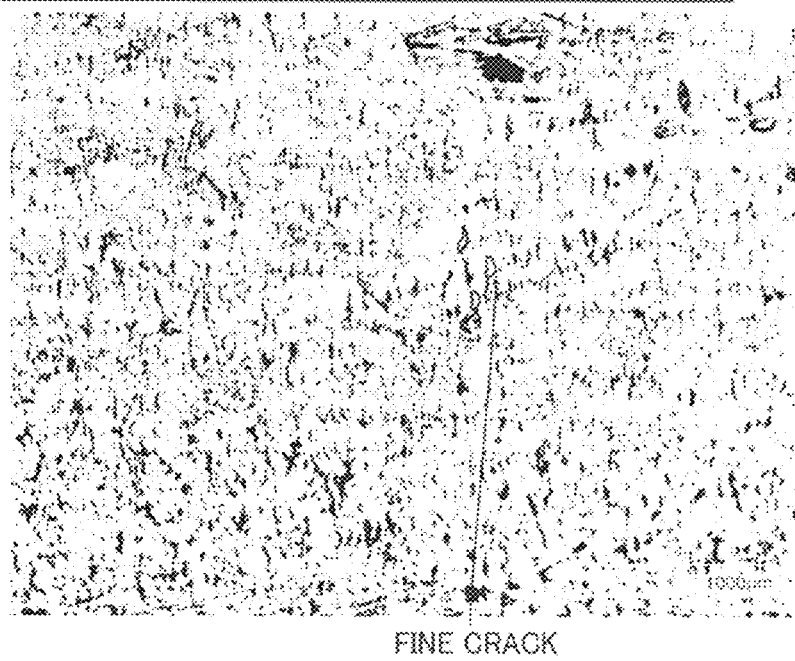
FIG. 16 A photograph showing the surface condition of Comparative Example 4 (rolling reduction: 60%).
Figure 17:
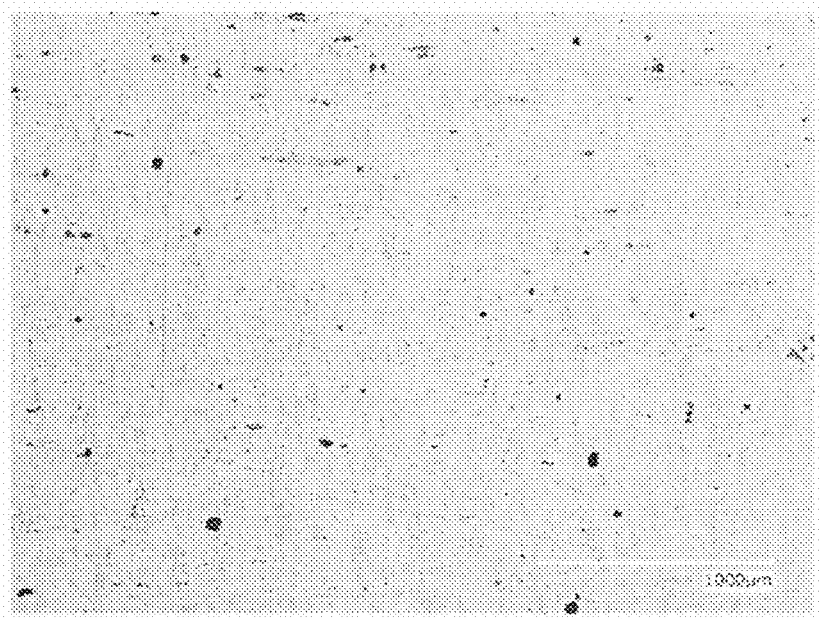
FIG. 17 A photograph showing the surface condition of Example 2 (rolling reduction: 60%) of the present invention.
Figure 18:
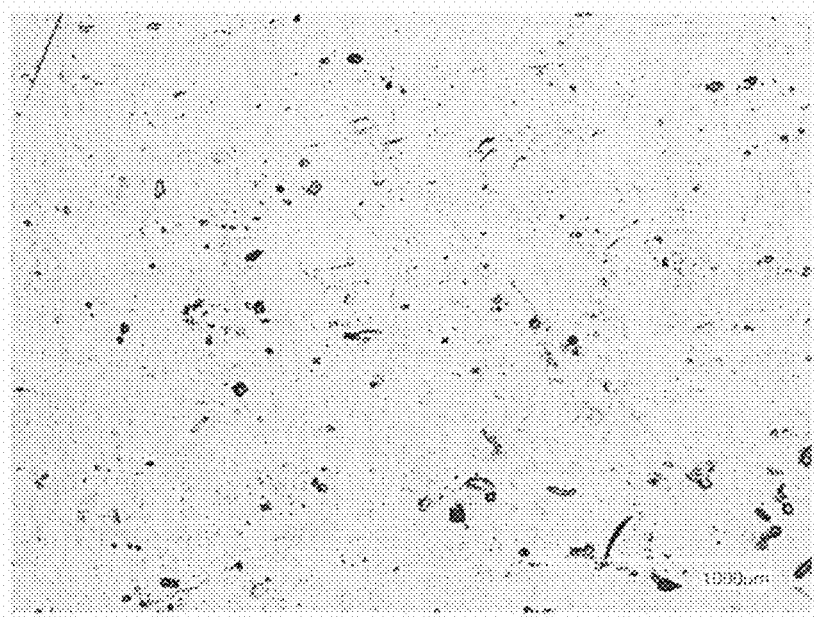
FIG. 18 A photograph showing the surface condition of Example 3 (rolling reduction: 60%) of the present invention.
Figure 19:
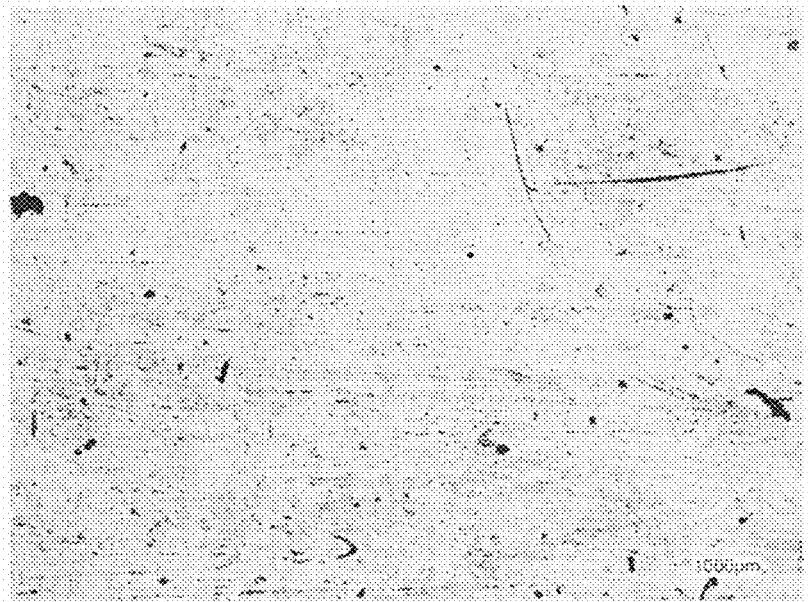
FIG. 19 A photograph showing the surface condition of Comparative Example 4 (rolling reduction: 40%).
Figure 20:
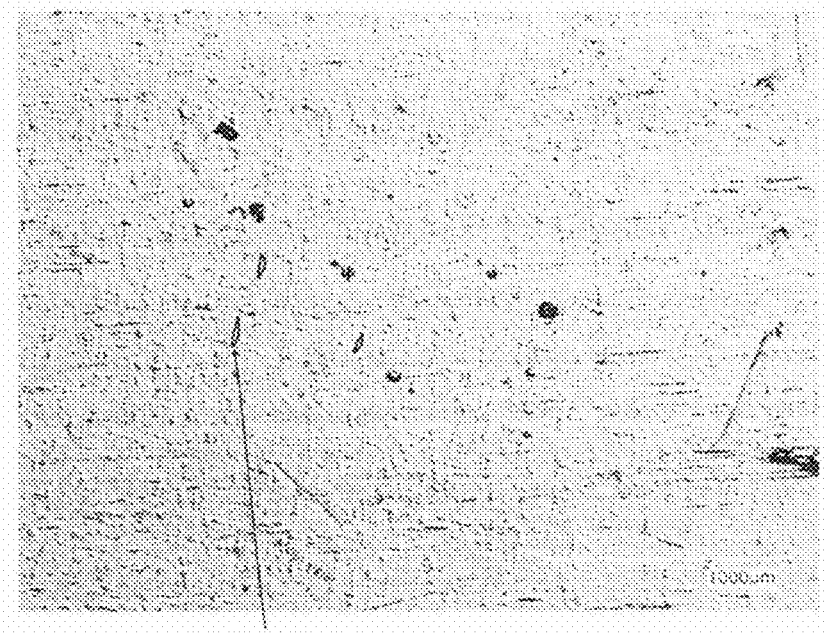
FIG. 20 A photograph showing the surface condition of Comparative Example 4 (rolling reduction: 80%).
Figure 21:
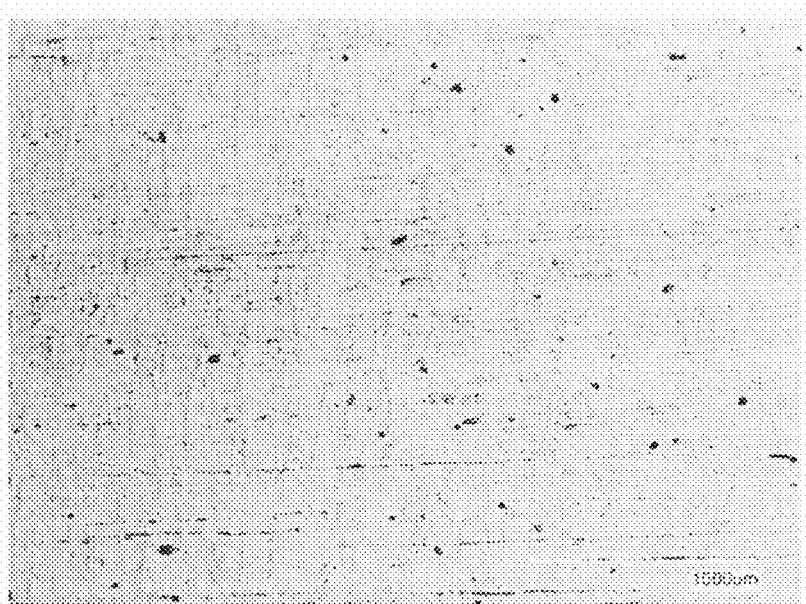
FIG. 21 A photograph showing the surface condition of Example 2 (rolling reduction: 40%) of the present invention.
Figure 22:
FIG. 22 A photograph showing the surface condition of Example 2 (rolling reduction: 80%) of the present invention.
Figure 23:
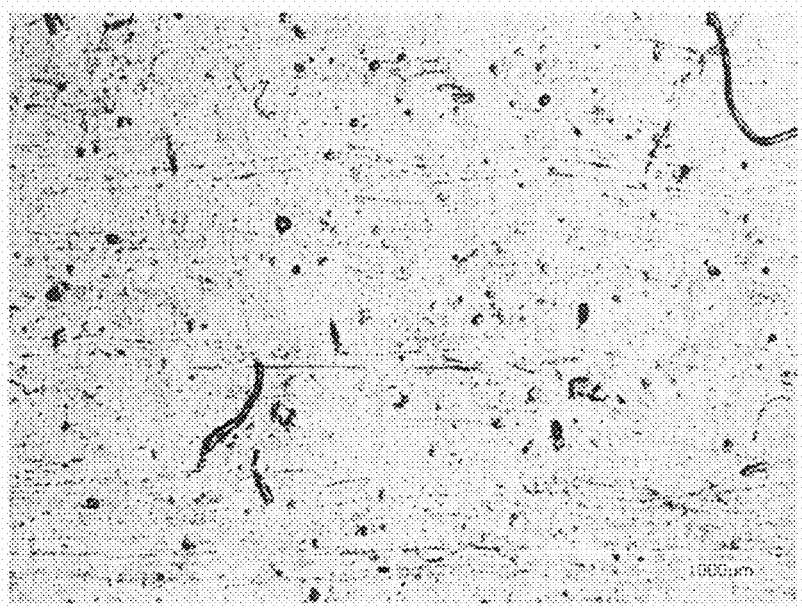
FIG. 23 A photograph showing the surface condition of Example 3 (rolling reduction: 40%) of the present invention.
Figure 24:
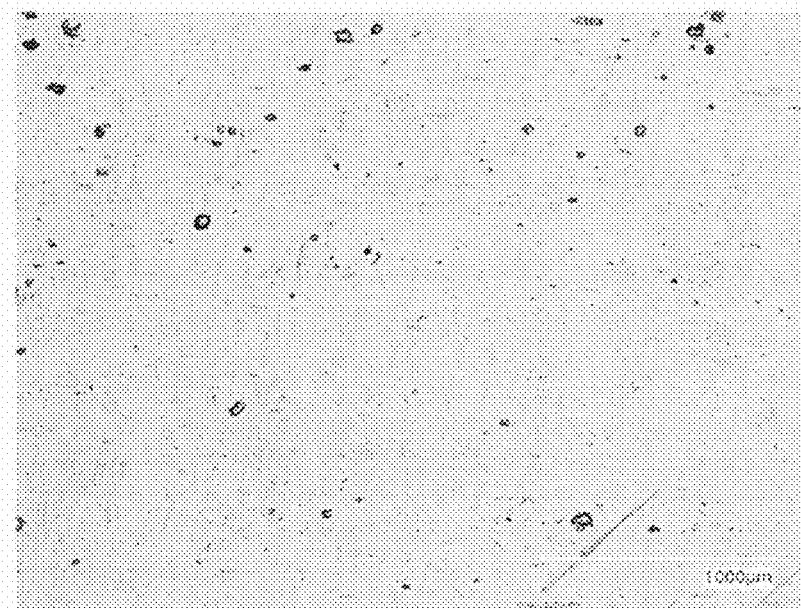
FIG. 24 A photograph showing the surface condition of Example 4 (rolling reduction: 80%) of the present invention.

Next, a belt-like (plate-shaped) Al material 402 made of Al or an Al-based alloy is prepared. Then, as shown in FIGS. 11 and 12, the Al material 402 and the Ni-plated Cu material 403b are stacked in the thickness direction (direction Z) such that the surface 302a and the surface 303a in the thickness direction are adjacent to each other. Thereafter, the surface 302a and the surface 303a in the thickness direction (direction Z) are bonded to each other by cold rolling using a roller 203. Thus, a band-shaped clad material 410 in which the Al material 402 and the Ni-plated Cu material 403b are bonded to each other in the thickness direction is made.

Thereafter, the diffusion annealing is performed on the clad material 410 similarly in the manufacturing process according to the aforementioned first embodiment. Consequently, a band-shaped clad material 310 (see FIGS. 8 and 9) is made. Finally, the negative electrode terminal 322 shown in FIGS. 7 and 8 is made by cutting the clad material 310 with a cutting machine 205 such that the length thereof in a longitudinal (rolling) direction becomes a predetermined length.

(Effects of Second Embodiment)

According to the second embodiment, the following effects are achieved.

According to the second embodiment, as described above, the heat treatment is performed on the Ni-plated Cu material 403a at the holding temperature of 650° C. or higher and 850° C. or lower, and the Al material 402 and the Ni-plated Cu material 403b on which the heat treatment has been performed are bonded to each other by the rolling to make the clad material 410 (310). Thus, similarly to the aforementioned first embodiment, a reduction in the bonding strength between the Ni-plated Cu material 403b and the Al material 402 (the bonding strength between the Ni-plated Cu portion 303 and the Al portion 302) can be significantly reduced or prevented while a reduction in the corrosion resistance of the clad material 310 is significantly reduced or prevented. Furthermore, the rolling is performed after Ni plating is performed such that a step corresponding to the thickness of the plating is not formed, and the thickness of the clad material can be set to a predetermined thickness.

According to the second embodiment, the surface 302a of the plate-shaped Al material 402 in the thickness direction and the surface 303a of the plate-shaped Ni-plated Cu material 403b in the thickness direction on which the heat treatment has been performed are made adjacent to each other and bonded to each other by the rolling. In manufacturing this clad material 310 in which the surfaces 302a and 303a are bonded to each other, the heat treatment is performed on the Ni-plated Cu material 403b at the holding temperature of 650° C. or higher and 850° C. or lower such that generation of cracks in the Ni plating layer 405 can be significantly reduced or prevented. Thus, a reduction in the bonding strength between the Ni-plated Cu material 403b and the Al material 402 can be significantly reduced or prevented while a reduction in the corrosion resistance of the Ni-plated Cu material 403b (Ni-plated Cu portion 303) is significantly reduced or prevented.

According to the second embodiment, the clad material 310 is used as the negative electrode terminal 322 for the lithium-ion secondary battery 320. Thus, the bus bar 301 and the negative electrode collector 313 made of different materials can be easily connected to each other by the clad material 310 in which the surfaces 302a and 303a are bonded to each other. The remaining effects of the second embodiment are similar to the effects of the aforementioned first embodiment.

(First Example)

A first example conducted to confirm the effect of the present invention is now described with reference to FIGS. 13 to 24. In the first example, Ni-plated Cu materials were actually made under different heat treatment conditions and different rolling conditions (rolling reductions). Then, the surface conditions of Ni plating layers in the Ni-plated Cu materials were observed and compared with each other, and quantitative analysis of gases released from the Ni-plated Cu materials was performed.

Specifically, Cu materials each having a thickness of 1.67 mm, 2.5 mm, or 5 mm and made of oxygen-free copper were prepared. Then, an electroplating treatment using a Watts bath was performed such that a Ni plating layer with a thickness of 5 μm was formed on the entire surface of each of the Cu materials. At this time, the current density and the plating time in the electroplating treatment are adjusted such that the Ni plating layer with a thickness of 5 μm was formed. Thus, a Ni-plated Cu material A with a thickness of 1.67 mm, a Ni-plated Cu material B with a thickness of 2.5 mm, and a Ni-plated Cu material C with a thickness of 5 mm were made.

Thereafter, a heat treatment was performed on the Ni-plated Cu materials A to C at different holding temperatures for 3 minutes. Specifically, in Comparative Examples 2, 3, and 4, the heat treatment was performed at holding temperatures of 400° C., 500° C., and 600° C., respectively. In Examples 1, 2, 3, and 4, the heat treatment was performed at holding temperatures of 650° C., 700° C., 800° C., and 850° C., respectively. In Comparative Example 5, the heat treatment was performed at a holding temperature of 900° C. In addition, Comparative Example 1 in which no heat treatment was performed was prepared.

Thereafter, the Ni-plated Cu materials A of Comparative Examples 1 to 5 and Examples 1 to 4 each having a thickness of 1.67 mm were rolled at a rolling reduction of 40%. The Ni-plated Cu materials B of Comparative Examples 1 to 5 and Examples 1 to 4 each having a thickness of 2.5 mm were rolled at a rolling reduction of 60%. The Ni-plated Cu materials C of Comparative Examples 1 to 5 and Examples 1 to 4 each having a thickness of 5 mm were rolled at a rolling reduction of 80%. Thus, the Ni-plated Cu materials A to C of Comparative Examples 1 to 5 and Examples 1 to 4 each having a thickness of 1 mm and with different holding temperatures and different rolling reductions were made.

Note that the thickness of the Ni plating layer in the Ni-plated Cu material A rolled at the rolling reduction of 40% was 3 μm, the thickness of the Ni plating layer in the Ni-plated Cu material B rolled at the rolling reduction of 60% was 2 μm, and the thickness of the Ni plating layer in the Ni-plated Cu material C rolled at the rolling reduction of 80% was 1 μm.

(Observation of Surface Conditions)

Thereafter, surfaces of the Ni-plated Cu materials of Comparative Examples 1 to 5 and Examples 1 to 4 were observed with a microscope (VHX-5000, manufactured by Keyence Corporation) at a magnification of 100 times. Photograph of the surface conditions of the Ni-plated Cu materials are partially shown in FIGS. 13 to 24.

Then, the surface conditions of the Ni-plated Cu materials of Comparative Examples 1 to 5 and Examples 1 to 4 were evaluated. The evaluation results are shown in Table 1. In Table 1, when large cracks of 500 μm or more were observed on the surface of the Ni-plated Cu material, a X (cross) mark was put. When fine cracks of 500 μm or less were observed on the surface of the Ni-plated Cu material, a Δ (triangle) mark was put. When no crack was observed on the surface of the Ni-plated Cu material, a ◯ (circle) mark was put.

TABLE 1

| | HOLDING TEMPERATURE (° C.) | ROLLING REDUCTION | | |
| --- | --- | --- | --- | --- |
| | | 40% (Ni-PLATED Cu MATERIAL A) | 60% (Ni-PLATED Cu MATERIAL B) | 80% (Ni-PLATED Cu MATERIAL C) |
| COMPARATIVE EXAMPLE 1 | — | X | X | X |
| COMPARATIVE EXAMPLE 2 | 400 | X | X | X |
| COMPARATIVE EXAMPLE 3 | 500 | ◯ | Δ | Δ |
| COMPARATIVE EXAMPLE 4 | 600 | ◯ | Δ | Δ |
| EXAMPLE 1 | 650 | ◯ | ◯ | ◯ |
| EXAMPLE 2 | 700 | ◯ | ◯ | ◯ |
| EXAMPLE 3 | 800 | ◯ | ◯ | ◯ |
| EXAMPLE 4 | 850 | ◯ | ◯ | ◯ |
| COMPARATIVE EXAMPLE 5 | 900 | Δ | Δ | Δ |

As shown in Table 1 and FIGS. 13 to 24, in Examples 1 to 4 in which the heat treatment was performed at the holding temperature of 650° C. to 850° C., no crack was observed on the surface of the Ni-plated Cu material at any rolling reduction of 40%, 60%, and 80%. In particular, no crack was observed on the surface of the Ni-plated Cu material at the rolling reduction of 80%, which is a large rolling reduction and at which the thickness of the Ni plating was reduced to 1 μm. On the other hand, in Comparative Examples 2 to 4 in which the heat treatment was performed at the holding temperature of less than 650° C. and Comparative Example 1 in which no heat treatment was performed, cracks were observed on the surfaces of the Ni-plated Cu materials at least at the rolling reduction of 80%.

This is conceivably because in the Ni-plated Cu materials of Examples 1 to 4, the Ni plating layers were sufficiently softened by the heat treatment such that the Ni plating layers could be deformed with deformation of the relatively soft Cu materials in rolling whereas in Comparative Examples 2 to 4 in which the heat treatment was performed at the holding temperature of less than 650° C. and Comparative Example 1 in which no heat treatment was performed, due to the high hardnesses of the Ni plating layers, the Ni plating layers could not be deformed with deformation of the Cu materials in the rolling. Note that large cracks were observed in Comparative Example 1 in which no heat treatment was performed and Comparative Example 2 in which the heat treatment was performed at the holding temperature of 400° C. This is conceivably because the Ni plating layers each have a high hardness. On the other hand, in Comparative Examples 3 and 4 in which the heat treatment was performed at the holding temperatures of 500° C. and 600° C., respectively, fine cracks were observed when the rolling was performed at the rolling reduction of 60% or more. This shows that in the Ni-plated Cu materials of Comparative Examples 3 and 4, the Ni plating layers were conceivably not sufficiently softened.

In Comparative Example 5 in which the heat treatment was performed at 900° C., fine cracks were observed on the surface of the Ni-plated Cu material at any rolling reduction of 40%, 60%, and 80%. This is because the diffusion rate of Ni became significantly higher than the diffusion rate of Cu due to the high holding temperature of 900° C. during the heat treatment. Therefore, a large amount of Ni was diffused into the Cu material during the heat treatment such that voids were formed at the interface between the Ni plating layer and the Cu material. These voids are considered to be Kirkendall voids generated by a difference in atomic diffusion rate. Consequently, it is believed that cracks were generated starting from the voids in the Ni plating layer of the Ni-plated Cu material of Comparative Example 5 during the rolling.

(Gas Quantitative Analysis)

Next, the quantitative analysis of the gases was performed using the Ni-plated Cu material of Example 2 in which the heat treatment was performed at the holding temperature of 700° C. and the Ni-plated Cu material of Comparative Example 1 in which no heat treatment was performed. Specifically, a gas analyzer is used to measure the detection intensity of a gas of a specific molecular weight when the heat treatment was performed to measure the amount of gas of the specific molecular weight. The gas analyzer includes a heating furnace in which a Ni-plated Cu material is placed and a general mass spectrometer that communicates with the heating furnace and through which a gas released from the Ni-plated Cu material flows.

As a specific test method, first, the interior of the furnace is heated from 50° C. to 700° C. at a heating rate of 1° C./sec in a state where a Ni-plated Cu material is placed in the heating furnace. Then, a gas of a predetermined molecular weight released from the Ni-plated Cu material (Ni plating layer) is detected such that the amount of gas of the predetermined molecular weight released from the Ni-plated Cu material at an arbitrary temperature from 50° C. to 700° C. was measured. While the temperature was raised from 50° C. to 700° C., the total amount of gas of the predetermined molecular weight released from the Ni-plated Cu material was measured. Here, the results of measurement of a gas having a molecular weight of 44 are shown. Incidentally, examples of the gas having a molecular weight of 44 include $CO^2$ (carbon dioxide) and $C_3H_8$ (propane).

Figure 25:
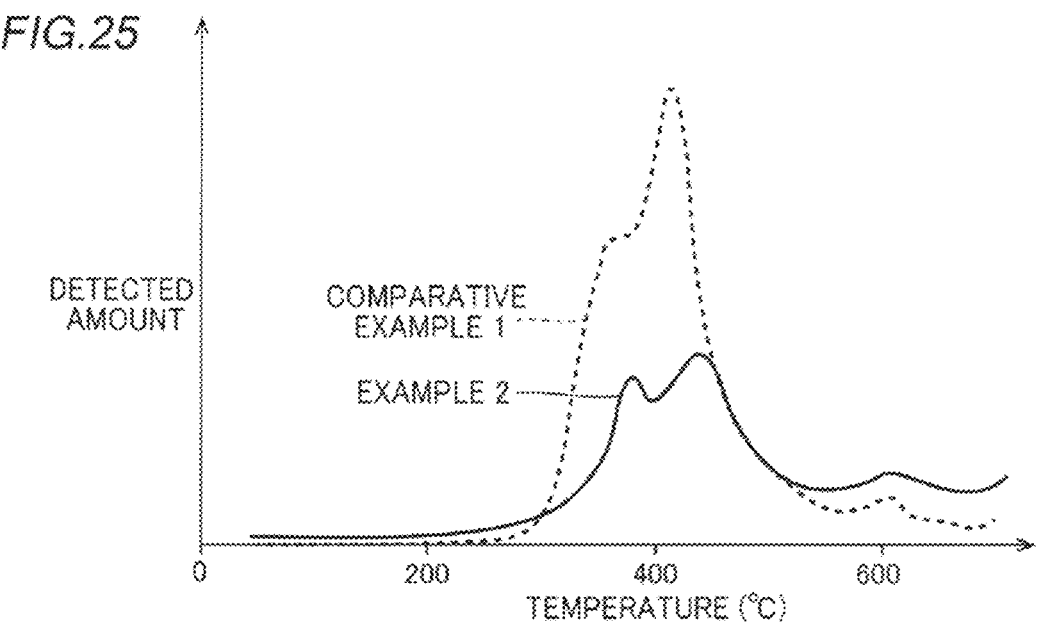
FIG. 25 A graph showing the results of gas quantitative analysis conducted to confirm the effect of the present invention.

As the test results, as shown in FIG. 25, most of the gas was released from the Ni-plated Cu material in the temperature range of 300° C. or higher. This is conceivably because a foreign organic substance in a Ni plating layer caused by a Watts bath reacted with oxygen to become $CO_2$, and was released from the Ni plating layer to the outside. In addition, this is conceivably because the foreign organic substance in the Ni plating layer caused by the Watts bath was thermally decomposed at 300° C. to 450° C. to become $C_3H_8$, and was released from the Ni plating layer to the outside. Here, in the Ni-plated Cu material of Example 2, the amount of gas release was remarkably reduced in the temperature range of 300° C. or higher as compared with the Ni-plated Cu material of Comparative Example 1. Furthermore, in the Ni-plated Cu material of Example 2, the total amount of released gas was 3.7 µg/g, and was remarkably reduced as compared with the Ni-plated Cu material of Comparative Example 1 in which the total amount of released gas was 5.3 µg/g.

This is conceivably because in the Ni-plated Cu material of Example 2, the gas in the Ni plating layer was released to some extent by the heat treatment performed in advance at the holding temperature of 700° C. Thus, it has been confirmable that the heat treatment is performed in advance before diffusion annealing such that release of the gas from the Ni plating layer due to heat applied at the time of performing the diffusion annealing can be significantly reduced or prevented, and thus generation of unbonded portions at the interface in the clad material can be significantly reduced or prevented.

(Second Example)

A second example conducted to confirm the effect of the present invention is now described with reference to FIG. 26. In the second example, Ni-plated Cu materials were actually made, and the hardnesses on surfaces of Ni plating layers were measured.

Specifically, Cu materials made of oxygen-free copper and each having a predetermined thickness were prepared. Then, an electroplating treatment using a Watts bath was performed such that a Ni plating layer with a thickness of 5 µm was formed on the entire surface of each of the Cu materials. At this time, a Ni-plated Cu material D including a matte Ni plating layer with a thickness of 5 µm was made using a Watts bath for matte Ni plating as the Watts bath. In addition, a Ni-plated Cu material E including a bright Ni plating layer with a thickness of 5 µm was made using a Watts bath for bright Ni plating as the Watts bath. Incidentally, additives for brightening are included in the Watts bath for bright Ni plating. The bright Ni plating layer generally has a higher hardness than the matte Ni plating layer.

Thereafter, a heat treatment was performed on the Ni-plated Cu materials at different holding temperatures for 3 minutes similarly in the aforementioned first example. Specifically, in Comparative Example 4, Example 2, Example 3, and Comparative Example 5, the heat treatment was performed at holding temperatures of 600° C., 700° C., 800° C., and 900° C., respectively. In addition, Comparative Example 1 in which no heat treatment was performed was prepared.

The Vickers hardnesses of the Ni plating layers were measured for the Ni-plated Cu materials of Comparative Example 1, Comparative Example 4, Example 2, Example 3, and Comparative Example 5 using a general Vickers tester. The percentages (%) of the Vickers hardnesses in the Ni-plated Cu materials of Comparative Example 4, Example 2, Example 3, and Comparative Example 5, where the Vickers hardness of the Ni-plated Cu material of Comparative Example 1 was 100, were calculated. The results are shown in Table 2, Table 3, and FIG. 26.

TABLE 2

MATTE PLATING (Ni-PLATED Cu MATERIAL D)

| | HOLDING TEMPERATURE (° C.) | VICKERS HARDNESS (HV) | PERCENTAGE (%) |
|---|---|---|---|
| COMPARATIVE EXAMPLE 1 | — | 197.2 | 100 |
| COMPARATIVE EXAMPLE 4 | 600 | 116.9 | 59 |
| EXAMPLE 2 | 700 | 87.2 | 44 |
| EXAMPLE 3 | 800 | 76.8 | 39 |
| COMPARATIVE EXAMPLE 5 | 900 | 85.8 | 44 |

TABLE 3

BRIGHT PLATING (Ni-PLATED Cu MATERIAL E)

| | HOLDING TEMPERATURE (° C.) | VICKERS HARDNESS (HV) | PERCENTAGE (%) |
|---|---|---|---|
| COMPARATIVE EXAMPLE 1 | — | 354.4 | 100 |
| COMPARATIVE EXAMPLE 4 | 600 | 107.3 | 30 |
| EXAMPLE 2 | 700 | 70.6 | 20 |
| EXAMPLE 3 | 800 | 65.1 | 18 |
| COMPARATIVE EXAMPLE 5 | 900 | 63.9 | 18 |

Figure 26:
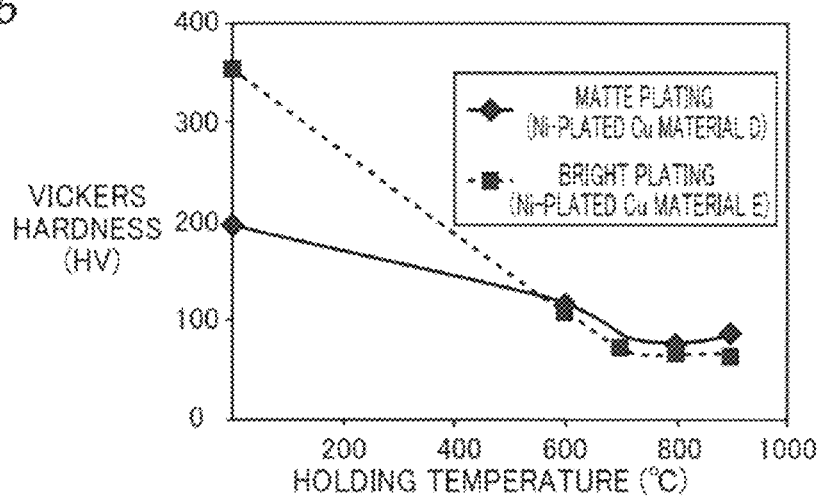
FIG. 26 A graph showing changes in Vickers hardness with respect to holding temperatures during a heat treatment.

As the test results, as shown in Table 2, Table 3, and FIG. 26, in Examples 2 and 3 and Comparative Example 5 in which the heat treatment was performed at 700° C. or higher, the Vickers hardnesses of the Ni plating layers became HV90 or less. Thus, it has been confirmable that the Ni plating layers are sufficiently softened in the Ni-plated Cu materials of Examples 2 and 3 and Comparative Example 5 in which the heat treatment was performed at 700° C. or higher. Furthermore, as shown in Table 2, it has been confirmable that in the Ni-plated Cu materials D of Examples 2 and 3 and Comparative Example 5 in which the heat treatment was performed at 700° C. or higher, the Vickers hardnesses of the matte Ni plating layers can be reduced to 44% or less as compared with the Vickers hardness of the Ni-plated Cu material D of Comparative Example 1. In addition, as shown in Table 3, it has been confirmable that in the Ni-plated Cu materials E of Examples 2 and 3 and Comparative Example 5 in which the heat treatment was performed at 700° C. or higher, the Vickers hardnesses of the bright plating layers can be reduced to 20% or less as compared with the Vickers hardness of the Ni-plated Cu material E of Comparative Example 1.

In Examples 2 and 3 and Comparative Example 5, the Vickers hardnesses of the Ni plating layers were not very different from each other. Consequently, it has been found that the heat treatment is performed at 700° C. or higher such that the Vickers hardness of the Ni plating layer can be sufficiently reduced. Accordingly, it has been confirmable from the results of the first example that the temperature range of 700° C. or higher and 800° C. or lower is suitable in order to significantly reduce or prevent generation of voids and reduce the hardness of the Ni plating layer.

(Third Example)

A third example conducted to confirm the effect of the present invention is now described with reference to FIGS. 4 to 6, 27, and 28. In the third example, the clad material 10

(parallel-bonded material) according to the aforementioned first embodiment was actually made, and the bonding strength at the bonding interface I was measured. Furthermore, a corrosion test was performed on the made clad material 10.

(Clad Material of Example 5)

First, a clad material 10 of Example 5 was made based on the manufacturing method according to the aforementioned first embodiment shown in FIGS. 4 to 6. Specifically, a Cu material 104 made of oxygen-free copper was prepared. Then, valleys and mountains were provided on a side end face of the Cu material 104 in a width direction (direction X). Thereafter, as shown in FIG. 4, an electrolytic plating treatment was performed on the Cu material 104 such that a Ni plating layer 5 having a thickness of 5 μm was formed on the entire surface of the Cu material 104. Thereafter, a heat treatment was performed on a Ni-plated Cu material 103a on which the Ni plating layer 5 was formed at a holding temperature of 800° C. for 3 minutes.

Then, a band-shaped (plate-shaped) Al material 102 made of Al was prepared. Then, valleys and mountains were provided on a side end face 2a of the Al material 102 in the width direction (direction X). Thereafter, in a state where the side end face 2a of the Al material 102 and the side end face 3a of the Ni-plated Cu material 103b were adjacent to each other, the Al material 102 and the Ni-plated Cu material 103b were bonded to each other by cold rolling at a rolling reduction of 60%. Finally, diffusion annealing was performed on the clad material 10 at 550° C. for 1 minute. Thus, the clad material 10 of Example 5 was made.

(Clad Material of Comparative Example 6)

On the other hand, a clad material of Comparative Example 6 was made in the same manner as in Example 5 described above except that the holding temperature was 400° C.

(Measurement of Bonding Strength)

Next, a tensile test was performed on specimens made of the clad material 10 of Example 5 and the clad material of Comparative Example 6 using a general tensile tester. Specifically, the ends of the specimens on the Al portion side and the ends of the specimens on the Ni-plated Cu portion side were fixed to a jig of the tensile tester machine, and a tensile stress was applied to the specimens by the tensile tester. Then, tensile stresses at the time of breaking bonded portions of the specimens were taken as the bonding strengths (N/mm$^2$) of the specimens. The bonding strengths of the two specimens 1 and 2 of Example 5 and the two specimens 1 and 2 of Comparative Example 6 were measured, and the average of the bonding strengths was calculated. The test results are shown in Table 4.

TABLE 4

| | HOLDING TEMPERATURE (° C.) | BONDING STRENGTH (N/mm$^2$) | | |
|---|---|---|---|---|
| | | SPECIMEN 1 | SPECIMEN 2 | AVERAGE |
| EXAMPLE 5 | 800 | 94.5 | 82.4 | 88.4 |
| COMPARATIVE EXAMPLE 6 | 400 | 62.7 | 56.1 | 59.4 |

As the test results, as shown in Table 4, the bonding strength (average value) of Example 5 was 88.4 N/mm$^2$. That is, it has been confirmable that sufficiently large bonding strength is obtained in the clad material 10 of Example 5. On the other hand, the bonding strength (average value) of Comparative Example 6 was 59.4 N/mm$^2$, which was about 67% of the bonding strength of Example 5.

Consequently, it has been confirmable that in Example 5 (corresponding to Example 3 of the first example) in which cracks are not generated in the Ni plating layer, the Al material and the Ni-plated Cu material are sufficiently bonded to each other at the bonding interface I. On the other hand, it has been confirmable that in Comparative Example 6 (corresponding to Comparative Example 2 of the first example) in which cracks are generated in the Ni plating layer, the Al material and the Ni-plated Cu material are not sufficiently bonded to each other at the bonding interface I due to the cracks. Furthermore, it is believed that in Comparative Example 6, gas in the Ni plating layer was released during the diffusion annealing such that the Al material and the Ni-plated Cu material were not sufficiently bonded to each other.

(Corrosion Resistance Test)

Figure 27:
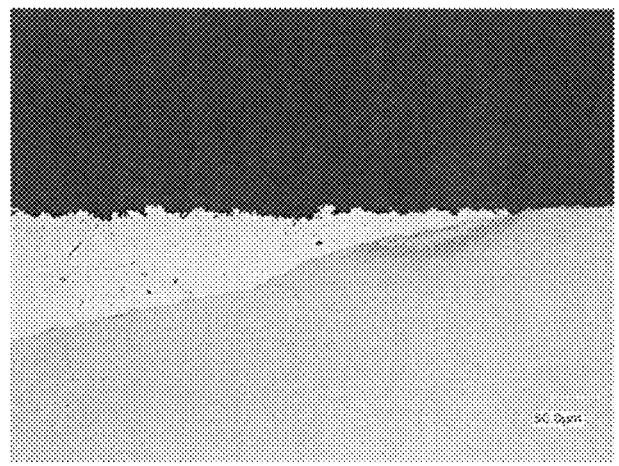
FIG. 27 A cross-sectional photograph of Example 5 after a corrosion resistance test conducted to confirm the effect of the present invention.

Next, a corrosion resistance test (salt spray test) was performed on the specimens made of the clad material 10 of Example 5 and the clad material of Comparative Example 6. In this corrosion resistance test, 5% salt water was sprayed on the specimens for 4 hours under the temperature condition of 35° C. Thereafter, the cross-sections of the specimens were observed using a scanning electron microscope (SEM) after the corrosion resistance test. The test results are shown in FIGS. 27 and 28.

Figure 28:
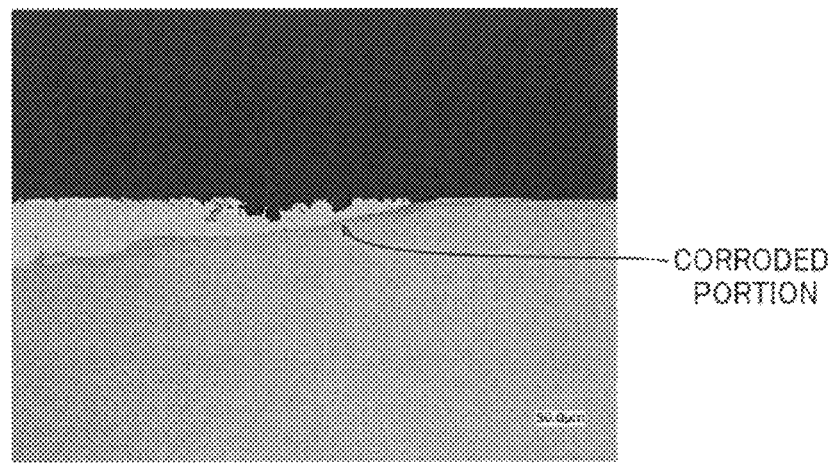
FIG. 28 A cross-sectional photograph of Comparative Example 6 after the corrosion resistance test.

As the test results, as shown in FIG. 28, in the clad material of Comparative Example 6, corrosion of the outer surface of the Al portion progressed by about 20 μm in a thickness direction. This is conceivably because a portion of the Cu material not covered with the Ni plating layer and the Al material were electrically connected to each other via the salt water due to cracks in the Ni plating layer such that the Al material in contact with the salt water ionized, and thus corrosion of the Al material progressed (so-called electrolytic corrosion occurred). On the other hand, as shown in FIG. 27, in the clad material 10 of Example 5, corrosion of the outer surface of the Al portion progressed by about 10 μm in the thickness direction, but it was not significant one. Consequently, it has been confirmable that the Cu material is covered with the Ni plating layer, and thus corrosion of the clad material can be significantly reduced or prevented.

[Modified Examples]

The embodiments and Examples disclosed this time must be considered as illustrative in all points and not restrictive. The range of the present invention is not shown by the above description of the embodiments and Examples but by the scope of claims for patent, and all modifications (modified examples) within the meaning and range equivalent to the scope of claims for patent are further included.

For example, while the example in which the Ni plating layer is formed on the surface of the Cu material 104 (404) using the Watts bath as an electroplating bath has been shown in each of the aforementioned first and second embodiments and the aforementioned first to third examples, the present invention is not restricted to this. According to the present invention, means that forms the Ni plating layer is not limited to the Watts bath. For example, the Ni plating layer may be formed on the surface of the Cu material using a sulfamic acid bath as an electroplating bath. Alternatively, the Ni plating layer may be formed on the surface of the Cu material by electroless plating instead of electroplating. In this case, the Ni plating layer contains P (phosphorus) in addition to Ni.

While the example in which the rolling reduction is set to about 40% or more and about 90% or less has been shown in the aforementioned first embodiment, the present invention is not restricted to this. According to the present invention, the rolling reduction may be set to less than about 40% or more than about 90%.

While the example in which the cold rolling treatment is performed on the Ni-plated Cu material cooled after the heat treatment has been shown in each of the aforementioned first and second embodiments, the present invention is not restricted to this. According to the present invention, a warm rolling treatment (or hot rolling treatment) may be performed on the Ni-plated Cu material on which the heat treatment has been performed. In this case, it is necessary to perform the warm rolling treatment (or hot rolling treatment) at a temperature at which melting of the Al material does not occur. The warm rolling treatment (or hot rolling treatment) is performed such that the rolling treatment can be continuously performed after the heat treatment, and thus the tact time can be reduced.

While the example in which the clad material 10 (310) used for the bus bar 1 or the negative electrode terminal 322 (terminal) is continuously made has been shown in each of the aforementioned first and second embodiments, the present invention is not restricted to this. According to the present invention, the clad material used for the bus bar or the terminal may not be continuously made. For example, a Ni-plated Cu material is individually made by performing a Ni plating treatment using a batch tank or the like on a Cu material formed in advance into a predetermined shape. Then, a heat treatment is performed on the Ni-plated Cu material. Thereafter, an Al material formed into a predetermined shape and the heat-treated Ni-plated Cu material are individually bonded to each other by rolling, and diffusion annealing is performed thereon. A clad material may be made through these steps.

While the example in which in the clad material 10, the Al portion 2 and the Ni-plated Cu portion 3 are bonded to each other in the direction perpendicular to the thickness direction has been shown in the aforementioned first embodiment, the present invention is not restricted to this. According to the present invention, in the clad material, a portion other than the Al portion and the Ni-plated Cu portion may be bonded to either the Al portion or the Ni-plated Cu portion in the direction perpendicular to the thickness direction.

While the example in which the Al material 102 and the Ni-plated Cu material 103 are bonded to each other by the rolling in a state where the side end face 2a and the side end face 3a on which the valleys and the mountains are provided engage with each other so as to make the clad material 110 of a parallel-bonded material has been shown in the aforementioned first embodiment, the present invention is not restricted to this. According to the present invention, the Al material and the Ni-plated Cu material may be bonded to each other by the rolling in a state where side end faces on which the valleys and the mountains are not provided come into contact with each other so as to make a clad material of a parallel-bonded material.

While the example in which the clad material 10 in which the Al portion 2 and the Ni-plated Cu portion 3 are bonded to each other in the direction perpendicular to the thickness direction is used as the bus bar 1 has been shown in the aforementioned first embodiment, the present invention is not restricted to this. According to the present invention, the clad material in which the Al portion and the Ni-plated Cu portion are bonded to each other in the direction perpendicular to the thickness direction may be used for applications other than the bus bar.

While the example in which the clad material 310 of which the negative electrode terminal 322 is made is an overlay clad material has been shown in the aforementioned second embodiment, the present invention is not restricted to this. According to the present invention, the clad material in which stacking is performed in the thickness direction is not limited to the overlay clad material. For example, the clad material may be a so-called edge-lay clad material in which a Ni-plated Cu material (or an Al material) is stacked on only one side surface side of the Al material (or the Ni-plated Cu material) in a thickness direction.

Figure 29:
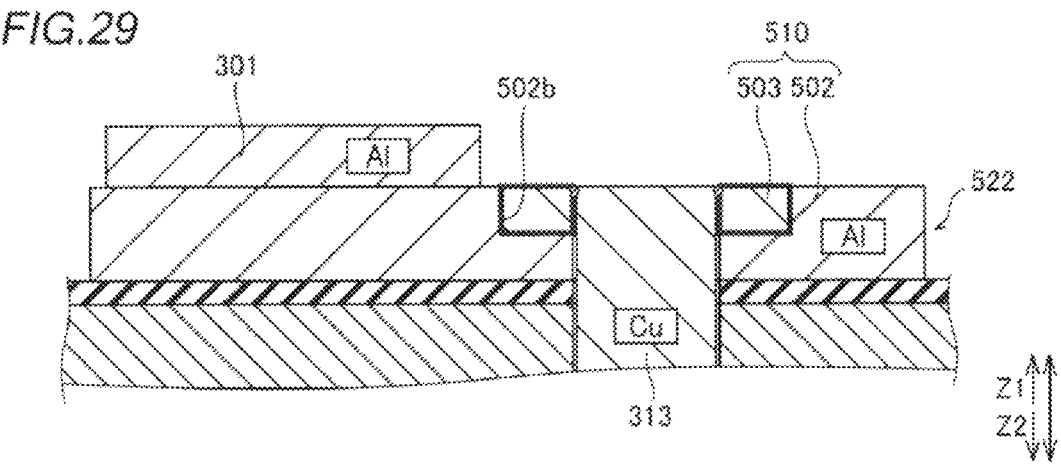
FIG. 29 A sectional view showing a state where a clad material according to a first modified example of the present invention is used as a negative electrode terminal.
Figure 30:
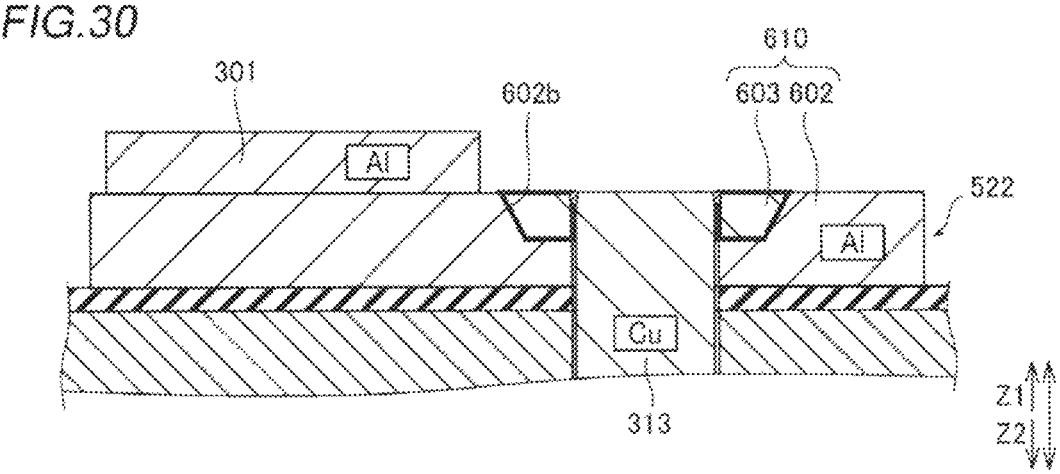
FIG. 30 A sectional view showing a state where a clad material according to a second modified example of the present invention is used as a negative electrode terminal.

As in first and second modified examples of the second embodiment shown in FIGS. 29 and 30, respectively, the clad material may be an inlay (stripe) clad material. Specifically, as in the first modified example of the second embodiment shown in FIG. 29, a clad material used as a negative electrode terminal 522 may be a so-called inlay clad material 510 in which a Ni-plated Cu portion (Ni-plated Cu material) 503 having a rectangular cross-section is embedded (stacked in a thickness direction (direction Z)) into a groove 502b having a rectangular cross-section and formed in an Al portion (Al material) 502. Furthermore, as in the second modified example of the second embodiment shown in FIG. 30, a clad material used as a negative electrode terminal 622 may be a so-called inlay clad material 610 in which a Ni-plated Cu portion (Ni-plated Cu material) 603 having a trapezoidal cross-section is embedded (stacked in a thickness direction (direction Z)) into a groove 602b having a trapezoidal cross-section and formed in an Al portion (Al material) 602. A method for manufacturing the clad material in each of the first and second modified examples of the second embodiment is the same as the method for manufacturing the clad material in the aforementioned second embodiment except that the groove is formed in the Al material, and rolling is performed in a state where the Ni-plated Cu material is embedded into in the formed groove.

Figure 31:
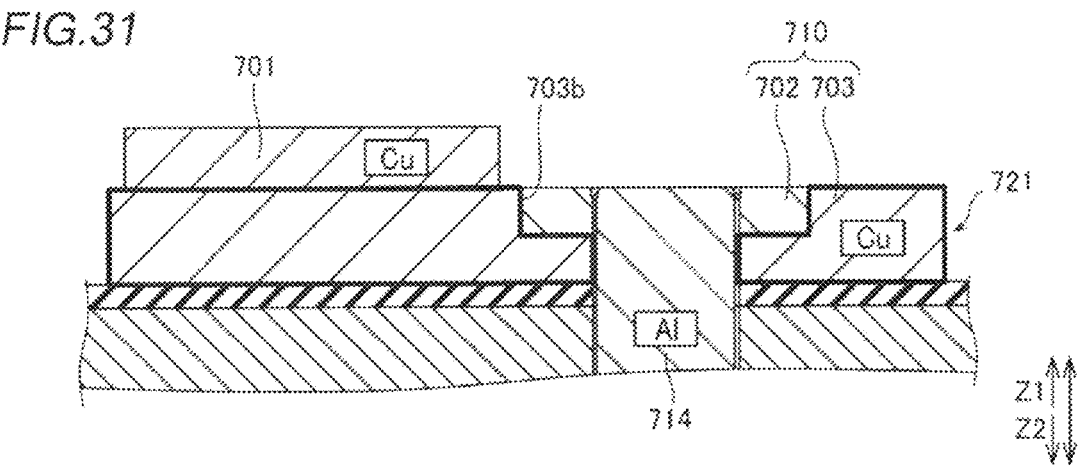
FIG. 31 A sectional view showing a state where a clad material according to a third modified example of the present invention is used as a positive electrode terminal.

While the example in which the clad material 310 in which the Al portion 302 and the Ni-plated Cu portion 303 are bonded to each other in a state where the same are stacked in the thickness direction is used as the negative electrode terminal 322 has been shown in the aforementioned second embodiment, the present invention is not restricted to this. According to the present invention, the clad material in which the Al portion and the Ni-plated Cu portion are bonded to each other in a state where the same are stacked in the thickness direction may be used as a positive electrode terminal instead of the negative electrode terminal. Furthermore, the positive electrode terminal may be any one of so-called overlay, edge-lay, and inlay clad materials. For example, as in a third modified example of the second embodiment shown in FIG. 31, a clad material used as a positive electrode terminal 721 may be a so-called inlay clad material 710 in which an Al portion (Al material) 702 having a rectangular cross-section is embedded (stacked in a thickness direction (direction Z)) into a groove 703b having a rectangular cross-section and formed in a Ni-plated Cu portion (Ni-plated Cu material) 703. In this case, a positive electrode collector 714 made of Al is bonded (welded) to the Al portion 702 side of the positive electrode terminal 721, and a bus bar 701 made of Cu is bonded (welded) to the Ni-plated Cu portion 703 side of the positive electrode terminal 721. A method for manufacturing the clad material in the third modified example of the second embodiment is the same as the method for manufacturing the clad material in the aforementioned second embodiment except that the groove is formed in the Ni-plated Cu material, and rolling is performed in a state where the Al material is embedded into the formed groove. Furthermore, the clad material in which the Al portion and the Ni-plated Cu portion are bonded to each other in a state where the same are stacked in the thickness direction may be used for applications other than the terminal.

While the example in which the clad material 310 is two-layered has been shown in the aforementioned second embodiment, the present invention is not restricted to this. According to the present invention, the clad material may have a three or more layer structure including another portion(s) (layer(s)) in addition to the Al portion and the Ni-plated Cu portion.

DESCRIPTION OF REFERENCE NUMERALS

1: bus bar
2a: side end face (of the Al material)
3a: side end face (of the Ni-plated Cu material)
10, 110, 310, 410: clad material
20, 320: lithium-ion secondary battery
102, 402: Al material
103a, 403a: Ni-plated Cu material (in which the Cu material is covered with the Ni plating layer)
103b, 403b: (heat-treated) Ni-plated Cu material
104, 404: Cu material
105, 405: Ni plating layer
302a: surface (of the Al material)
303a: surface (of the Ni-plated Cu material)
322: negative electrode terminal (terminal)

The invention claimed is:

1. A method for manufacturing a clad material, comprising:
performing a Ni plating treatment on a Cu material made of Cu or a Cu-based alloy to make a Ni-plated Cu material in which the entire surface of the Cu material is covered with a Ni plating layer;
softening the Ni-plated Cu material by performing a softening heat treatment as a first heat treatment on the Ni-plated Cu material at a holding temperature of 650° C. or higher and 850° C. or lower before rolling;
bonding an Al material made of Al or an Al-based alloy and the softened Ni-plated Cu material on which the softening heat treatment has been performed to each other by rolling to make the clad material after performing the softening heat treatment; and
performing diffusion annealing as a secondary heat treatment on the clad material at an annealing holding temperature of 500° C. or higher and 600° C. or lower which is lower than the holding temperature after rolling.

2. The method for manufacturing the clad material according to claim 1, wherein the Al material and the Ni-plated Cu material on which the softening heat treatment has been performed are bonded to each other by the rolling at a rolling reduction of 40% or more and 90% or less.

3. The method for manufacturing the clad material according to claim 2, wherein the Al material and the Ni-plated Cu material on which the softening heat treatment has been performed are bonded to each other by the rolling at a rolling reduction of 60% or more and 80% or less.

4. The method for manufacturing the clad material according to claim 1, wherein the holding temperature is 700° C. or higher and 850° C. or lower.

5. The method for manufacturing the clad material according to claim 1, wherein the softening heat treatment is performed on the Ni-plated Cu material at the holding temperature for 0.5 minutes or more and 5 minutes or less.

6. The method for manufacturing the clad material according to claim 1, wherein
each of the Al material and the Ni-plated Cu material is plate-shaped, having a side end face perpendicular to a thickness direction, and
the side end face of the plate-shaped Al material perpendicular to the thickness direction and the side end face of the plate-shaped and heat-treated Ni-plated Cu material perpendicular to the thickness direction are made adjacent to each other and bonded to each other by the rolling.

7. The method for manufacturing the clad material according to claim 6, wherein the clad material is a bus bar for a lithium-ion secondary battery.

8. The method for manufacturing the clad material according to claim 1, wherein
each of the Al material and the Ni-plated Cu material is plate-shaped, and
a surface of the plate-shaped Al material in a thickness direction and a surface of the plate-shaped and heat-treated Ni-plated Cu material in the thickness direction are made adjacent to each other and bonded to each other by the rolling.

9. The method for manufacturing the clad material according to claim 8, wherein the clad material is a terminal for a lithium-ion secondary battery.

* * * * *